United States Patent [19]

Yoshida

[11] Patent Number: 5,721,731
[45] Date of Patent: Feb. 24, 1998

[54] DATA COMMUNICATION APPARATUS

[75] Inventor: Takehiro Yoshida, Tokyo, Japan

[73] Assignee: Canon Kabushiki Kaisha, Japan

[21] Appl. No.: 590,171

[22] Filed: Jan. 23, 1996

[30] Foreign Application Priority Data

Jan. 25, 1995 [JP] Japan ................................ 7-009781
Mar. 3, 1995 [JP] Japan ................................ 7-044188

[51] Int. Cl.$^6$ ................................................ H04B 3/20
[52] U.S. Cl. ................................................ 370/296
[58] Field of Search ........................ 370/31, 32, 14, 370/276, 277, 278, 279, 282, 245, 294, 293, 296, 465, 466, 467, 468; 375/222; 379/96, 93, 1, 34, 222

[56] References Cited

U.S. PATENT DOCUMENTS

| | | | |
|---|---|---|---|
| 4,729,033 | 3/1988 | Yoshida | 358/257 |
| 4,771,417 | 9/1988 | Maxwell et al. | 370/31 |
| 4,814,894 | 3/1989 | Yoshida | 3518/298 |
| 4,829,524 | 5/1989 | Yoshida | 371/32 |
| 4,885,755 | 12/1989 | Yoshida | 375/58 |
| 5,022,072 | 6/1991 | Sakakibara et al. | 379/100 |
| 5,031,179 | 7/1991 | Yoshida et al. | 371/32 |
| 5,172,246 | 12/1992 | Yoshida | 358/406 |
| 5,216,705 | 6/1993 | Yoshida et al. | 379/100 |
| 5,220,439 | 6/1993 | Yoshida | 358/404 |
| 5,307,179 | 4/1994 | Yoshida | 358/440 |
| 5,438,427 | 8/1995 | Yoshida | 358/405 |
| 5,493,609 | 2/1996 | Winseck et al. | 379/96 |
| 5,528,679 | 6/1996 | Taarud | 379/34 |

*Primary Examiner*—Dang Ton
*Attorney, Agent, or Firm*—Fitzpatrick, Cella, Harper & Scinto

[57] ABSTRACT

When a protocol signal by a full duplex communication is transmitted and received, an error termination due to the disabling of the full duplex communication in the course of the communication is minimized. When an acknowledge signal is not received within a predetermined period from the start of the sending of the protocol signal by a modem to a destination station, a control circuit switches the protocol from the execution of the V.8 or V.34 protocol by the full duplex communication to the execution of the V.21 protocol of the T.30 and continues the image communication. Further, when the protocol signal is transmitted and received by the full duplex communication, the error termination due to the disabling of the full duplex communication in the course of the communication is minimized. When the acknowledge signal is not received within the predetermined period from the start of the sending of the protocol signal to the destination station, the execution of the V.8 or V.34 protocol by the full duplex communication is terminated in error and the image communication is executed at redialing by the V.21 protocol of the T.30.

24 Claims, 25 Drawing Sheets

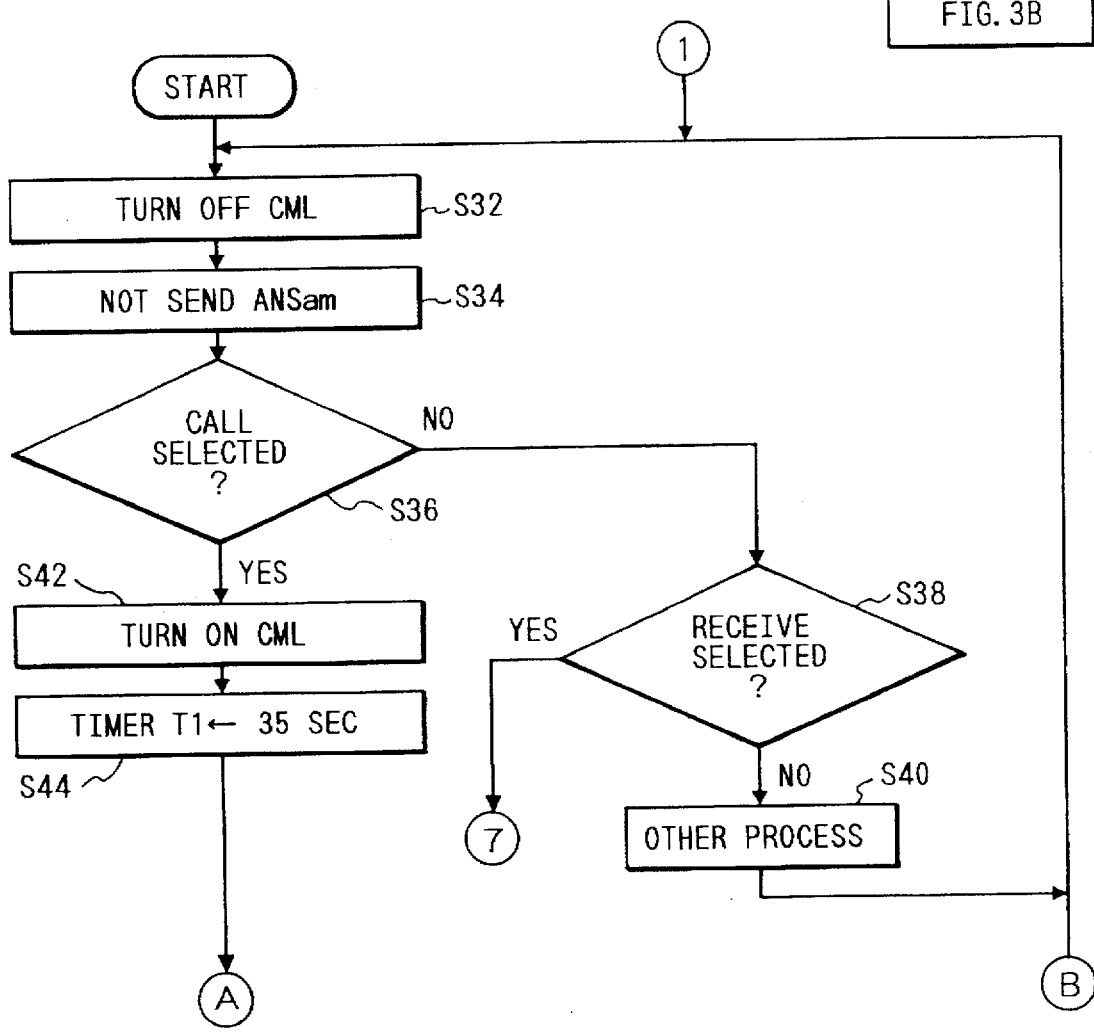

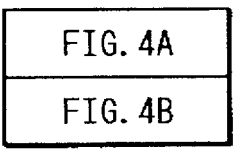
FIG. 4
| FIG. 4A |
|---|
| FIG. 4B |
FIG. 4A
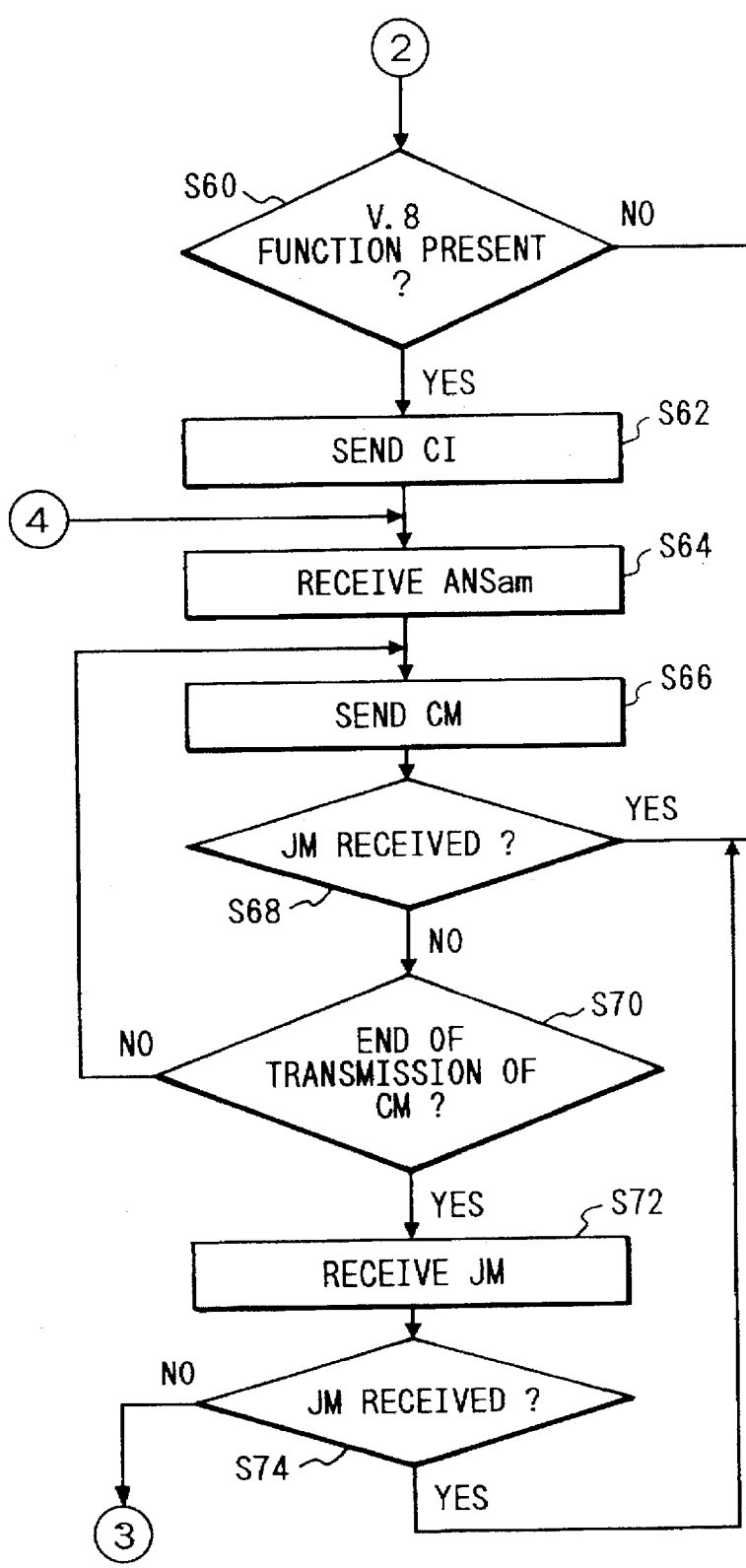

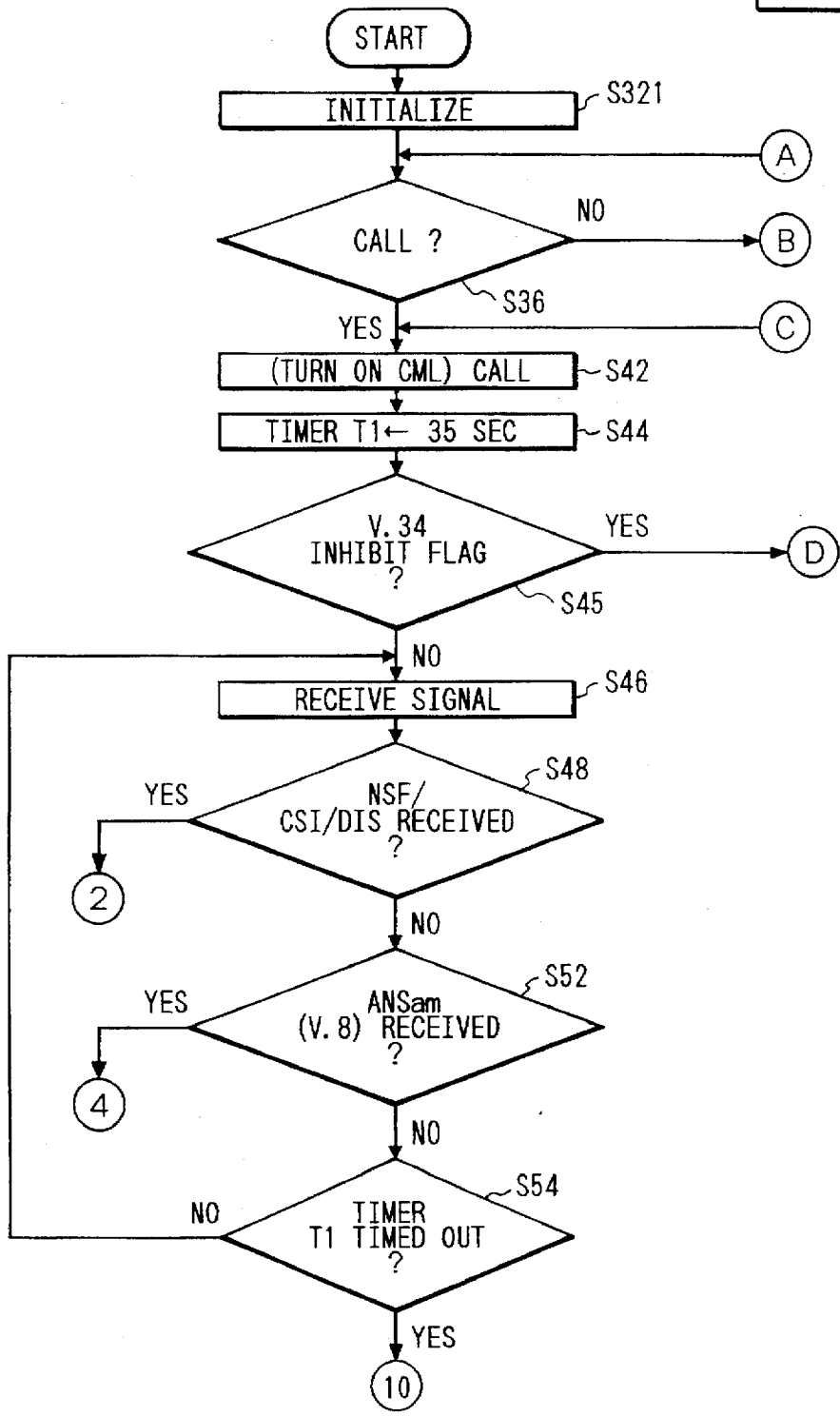

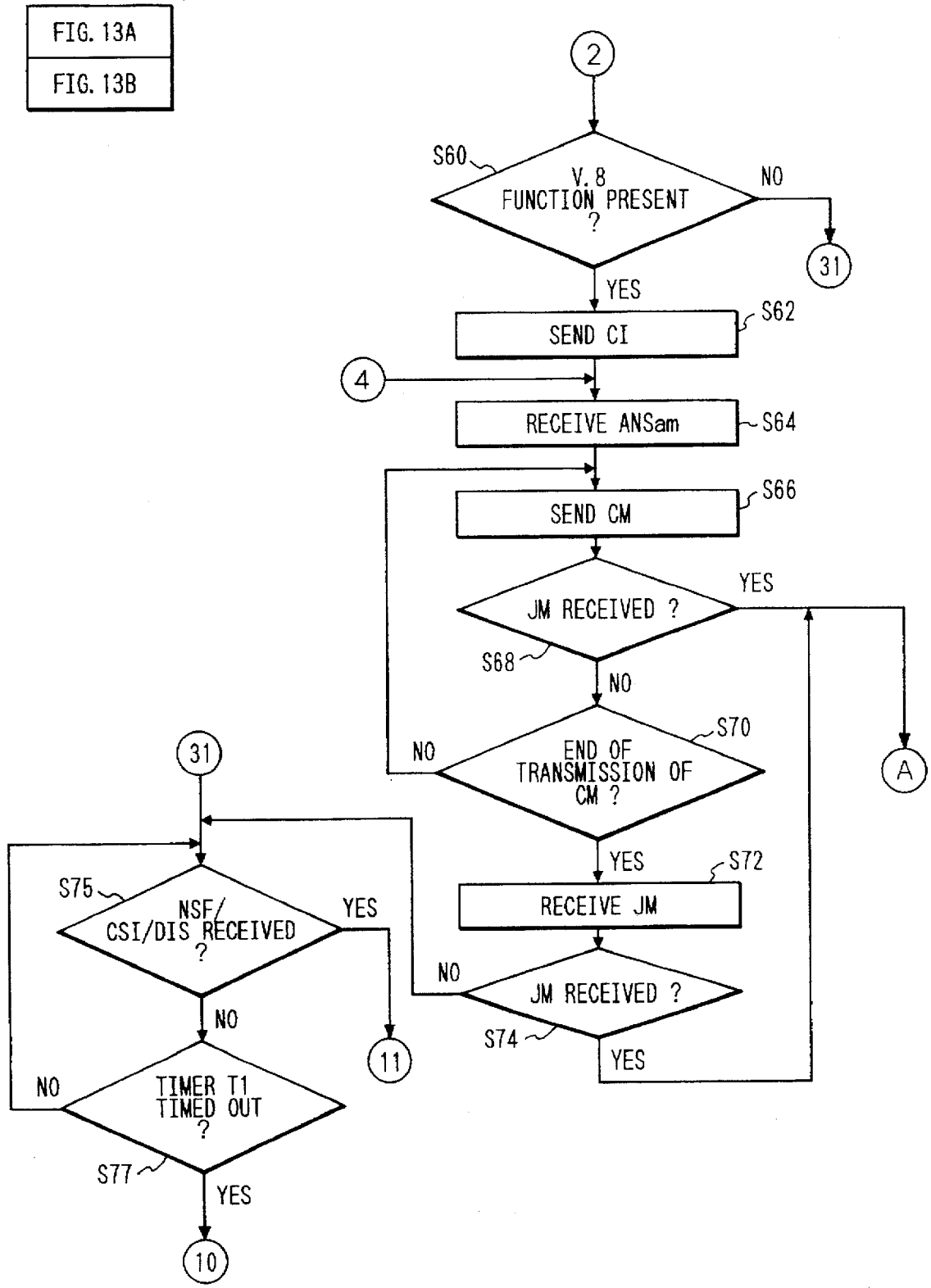

FIG. 19

| | 24-1 TEL NUMBER | 24-2 NAME | 24-3 V.34 SUCCESS RATIO | 24-4 V.34 INHIBIT FLAG | 24-5 |
|---|---|---|---|---|---|
| A | 03-3757-1234 | ×× CORP. | 100% (7/7) | 0 | |
| B | 045-321-5678 | ○○○ CORP. | 80% (8/10) | 0 | |
| C | 03-3777-5555 | △△ CORP. | 100% (5/5) | 0 | |
| D | 001-1-212-658-2121 | ABC Inc. | 10% (1/10) | 1 | |
| E | 001-1-516-782-1919 | XYX CORP. | 40% (2/5) | 0 | |
| ---------- | ---------- | ---------- | ---------- | ---------- | |
| N | 03-3767-3333 | ×○△ | NO V.34 FUNCTION | 1 | |
| O | 0166-71-2525 | ○× CORP. | 30% (3/10) | 1 | |

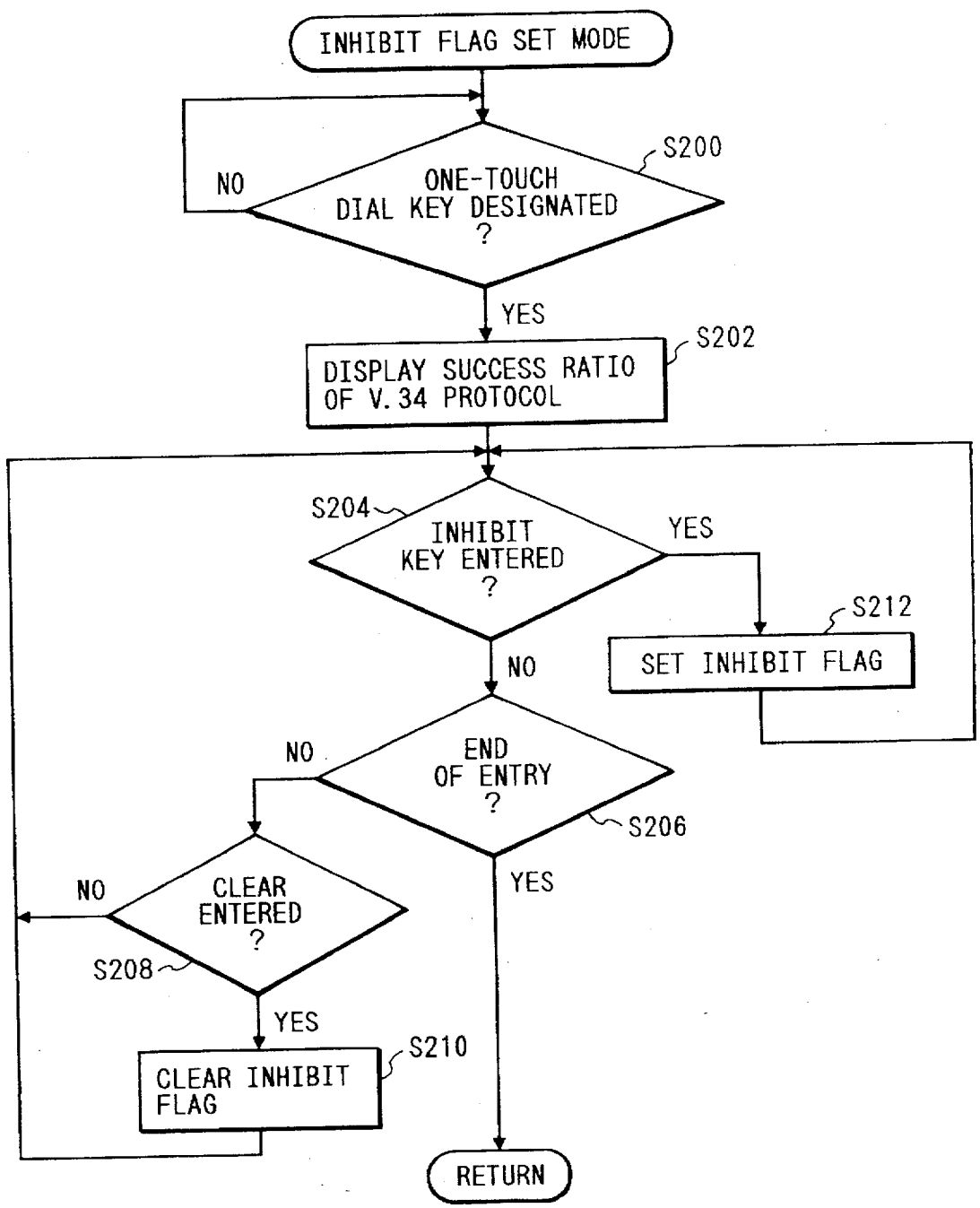

DATA COMMUNICATION APPARATUS

BACKGROUND OF THE INVENTION

1. Field of the Invention

The present invention relates to a data communication apparatus, and more particularly to a data communication apparatus for transmitting and receiving a communication protocol signal by a full duplex communication.

2. Related Background Art

In a prior art apparatus of this type, for example, a facsimile apparatus, it has been contemplated to transmit and receive a protocol signal for setting a communication mode, etc., in a full duplex communication, which protocol signal has heretofore been transmitted and received by a half duplex communication, in order to reduce a communication time.

However, whether the full duplex communication is permitted or not largely depends on a quality of a line. Thus, even if the transmission and reception of the protocol signal by the full duplex communication is permitted at a time of line connection, the full duplex communication may not be continued because the quality of the line is lowered during the communication. In such a case, the communication terminates with error in the middle of the communication because the full duplex communication is not permitted.

As above mentioned, whether the full duplex communication is permitted or not largely depends on the quality of the line. Accordingly, even if a communication partner has a function of a communication protocol by the full duplex communication, the protocol of the full duplex communication may not be attained if the quality of the line to the partner is not good. Thus, it may be possible to switch to a normal protocol if the protocol of the full duplex communication is not permitted in the course of a series of communications, but the overall protocol when the protocol is switched in the course of communication is complex.

SUMMARY OF THE INVENTION

It is an object of the present invention to improve a data communication apparatus.

It is another object of the present invention to provide an apparatus which minimizes an error termination of the full duplex communication due to the drop of the quality of the line in the course of the full duplex communication.

It is still another object of the present invention to provide an apparatus which permits a proper communication without complicating the communication protocol by starting the communication by one of the full duplex protocol and the half duplex in accordance with the quality of the line.

BRIEF DESCRIPTION OF THE DRAWINGS

FIG. 19 shows information stored in association with one-touch key dials, and FIG. 20 shows a flow chart of a control operation of a fourth embodiment.

DETAILED DESCRIPTION OF THE PREFERRED EMBODIMENTS

[Embodiment 1]

An Embodiment 1 of the present invention is now explained in detail with reference to the drawings.

In the Embodiment 1, a facsimile apparatus is explained although the present invention is applicable to any data communication apparatus capable of the full duplex communication to communicate a protocol signal and data.

Figure 1:
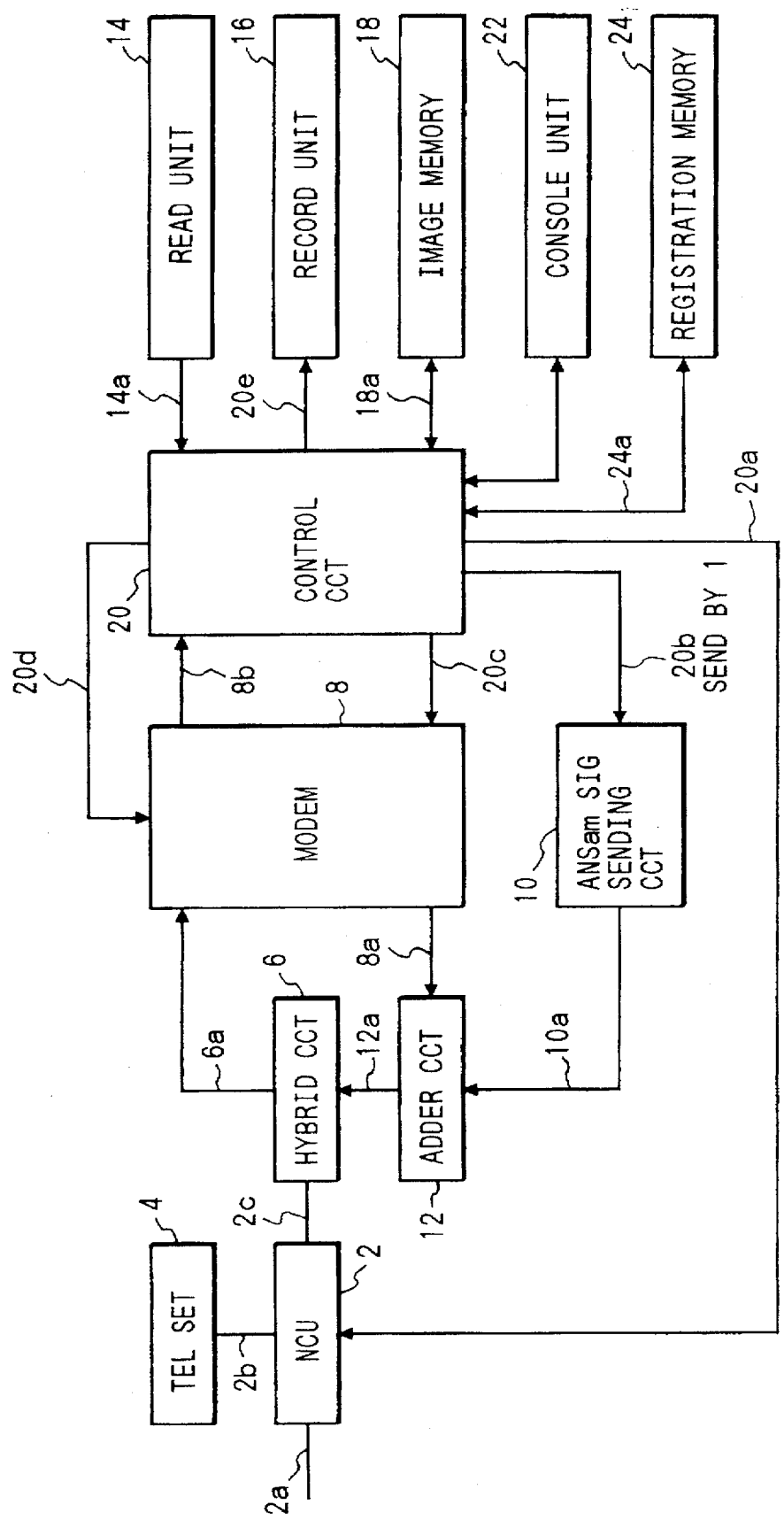
FIG. 1 shows a block diagram of a configuration of a facsimile apparatus in accordance with an embodiment.

FIG. 1 shows a block diagram of a configuration of the facsimile apparatus of the Embodiment 1.

In FIG. 1, numeral 2 denotes an NCU (network control unit) which comprises a CML relay for selectively connecting a telephone line 2a of a public network to a telephone set 4 or a hybrid circuit 6, a loop forming circuit for forming a line loop of the telephone line 2a and a CI detection circuit for detecting a call signal (CI signal) from the telephone line 2a.

The hybrid circuit 6 separates a signal of a transmission circuit from a signal of a receiving circuit.

Numeral 8 denotes a modem which demodulates the signal of the receiving circuit from the hybrid circuit 6 to output it to a control circuit 20 as digital data and modulates the digital data from the control circuit 20 to output it to the hybrid circuit 6 as the signal of the transmission circuit via an coder circuit 12. The modem 8 has functions of the V series Recommendation V.8, V.21 and V.34 for the modulation and the demodulation of the protocol signal and V.27ter, V.29, V.17 and V.34 for the modulation and the demodulation of the image signal. Those modulation and demodulation systems and the transmission rates are switched by a control signal from the control circuit 20.

Numeral 10 denotes an ANSam signal sending circuit for sending an ANSam signal (which is derived by modulating a 2100 Hz signal) for disabling an echo suppressor function or an echo canceler function of the public network and transmitting and receiving the V.8 full duplex communication protocol signal, to the line 2a through the adder circuit 12, the hybrid circuit 6 and the NCU 2. The ANSam signal sending circuit 10 sends the ANSam signal in accordance with a control signal from the control circuit 20.

Numeral 14 denotes a read unit for reading a document sheet and numeral 16 denotes a record unit for recording the image signal as an image.

Numeral 18 denotes an image memory for storing the read image data and the received image data.

Numeral 20 denotes the control circuit which comprises a microcomputer, a ROM and a RAM. The control circuit 20 controls the read unit 14 and the record unit 16, controls the input of various key signals from a console unit (or operation unit) 22, controls the display of display units provided in the console unit 22, encodes and decodes the image data (encoding/decoding by MH, MR or MMR), controls the switching of the modulation system of the modem 8, controls the transmission rate, controls the sending of the signal by the ANSam signal sending circuit 10 and controls the transmission and reception of the protocol signal, to be described later and the communication sequence of the image data communication.

The present embodiment is briefly explained.

Figure 2:
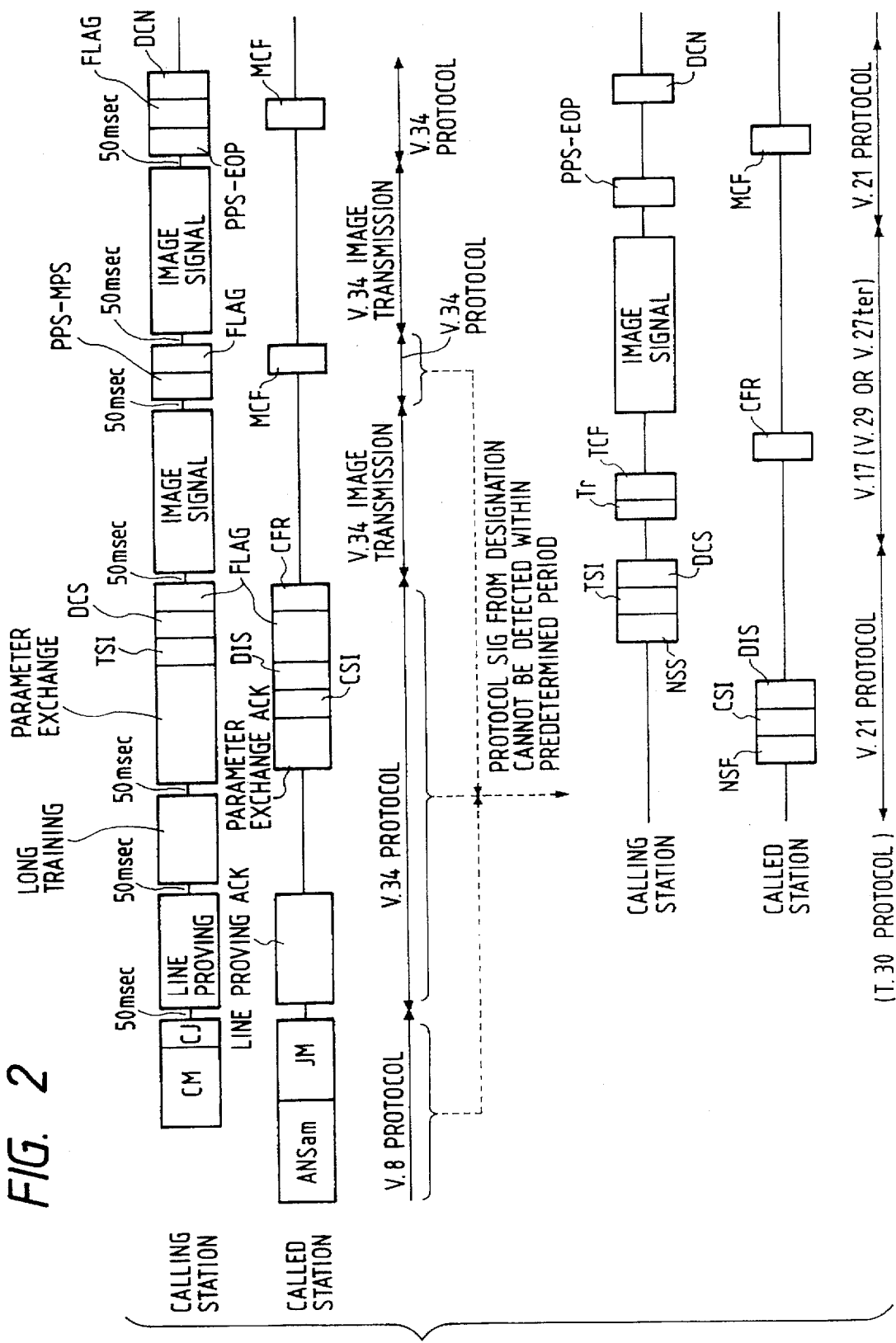
FIG. 2 shows a communication sequence in the embodiment, FIG. 3, comprised of FIGS. 3A and 3B, shows a flow chart of a control operation of the embodiment, FIG. 4, comprised of FIGS. 4A and 4B, shows a flow chart of a control operation of the embodiment.

In the present embodiment, the protocol signal is first transmitted and received by the full duplex communication. FIG. 2 shows a communication sequence of the present embodiment.

In response to a call, a called station sends an ANSam signal (derived by modulating a 2100 Hz signal by 15 Hz) from the ANSam signal sending circuit 10. By the ANSam signal, the echo suppressor function or the echo canceler function of the public network is disabled and the full duplex communication is enabled. When a calling station receives the ANSam signal from the called station, it sends a CM signal by the V.8 modulation to inform transmission modes which are executable in the image signal transmission to the called station. When the called station receives the CM signal, it stops to send the ANSam signal and sends a JM signal by the V.8 modulation. The called station informs to the calling station by the JM signal a transmission mode executable in the called station among the executable transmission modes informed by the CM signal. When the calling station receives the JM signal, it stops to send the CM signal and sends a CJ signal by the V.8 modulation. The calling station informs to the called station by the CJ signal a transmission mode determined in accordance with the JM signal. When the called station receives the CJ signal, it stops to send the JM signal and proceeds to the reception of a line proving signal from the calling station.

On the other hand, after the elapse of 50 msec from the stop of the sending of the CJ signal, the calling station sends the line proving signal (modulated by V.34) to check a status of the line 2a. Since a break of the signal during that period is 50 msec, the echo suppressor function or the echo canceler function of the public network is kept disabled. On the other hand, when the called station receives the line proving signal, it sends an acknowledge signal (modulated by V.34) for the line proving signal to inform a sending level of the subsequent signal, correction of an amplitude level and a transmission baud rate to the calling station, and proceeds to the reception of a long training signal from the calling station.

When the calling station receives the acknowledge signal, it stops to send the line proving signal, and after the elapse of 50 msec from the stop of the sending, it sends the long training signal modulated by V.34. The called station adjusts an equalizer of the V.34 modulation and detects a timing in accordance with the long training signal.

After the elapse of 50 msec from the sending of the long training signal, the calling station sends a parameter exchange signal of the V.34 modulation. When the called station receives the parameter exchange signal, it sends a parameter exchange acknowledge signal of the V.34 modulation to inform to the calling station subsequent link correction and bit rate. The called station sends CSI and DIS signals of the T.30 Recommendation by the V.34 modulation following to the parameter exchange acknowledge signal and further sends a flag (dummy signal) until it receives TSI and DCS signals of the T.30 Recommendation from the calling station.

When the calling station receives the CSI and DIS signals, it stops to send the parameter exchange signal, and after it sends the TSI and DCS signals by the V.34 modulation, it sends a flag until it receives a CFR signal from the called station. On the other hand, when the called station receives the TSI and DCS signals from the calling station, it stops to send the flag and sends the CFR signal by the V.34 modulation.

When the calling station receives the CFR signal, it stops to send the flag, and after the elapse of 50 msec, it sends an image signal by a transmission mode which was set in the previous protocol and the called station receives the image signal in the established transmission mode. The transmission and the reception of the image signal may be either error retransmission communication by the full duplex communication or error retransmission communication (ECM communication) by the half duplex communication.

When the calling station sends one page of image signal and then sends a next page of image signal in the same transmission mode, it sends a PPS-MPS signal (for ECM of the T.30 Recommendation) after the elapse of 50 msec from the end of sending of the image signal and sends a flag until it receives an MCF signal from the calling station. When the next page is to be transmitted in a different transmission mode, the calling station sends a PPS-EOM signal in place of the PPS-MPS signal.

When the called station receives the PPS-MPS signal following to the image signal, it sends the MCF signal if it receives the image signal in a good condition, and proceeds to the reception of the next page of image signal.

When the calling station receives the MCF signal, it stops to send the flag, and after the elapse of 50 msec, it sends the next page of image signal. If it is the last page, it sends the PPS-EOP signal after the elapse of 50 msec from the end of the sending of the page of image signal and sends a flag until it receives the MCF signal from the called station. Since a signal break longer than 50 msec does not occur in the above communication process, the echo suppressor function or the echo canceler function is kept disabled.

When the calling station receives the MCF signal from the called station, it stops to send the flag and sends a DCN signal.

In the above V.8 and V.34 protocols, if the calling station or the called station does not receive the acknowledge signal for the sent protocol signal within a predetermined time from the start of the sending of the protocol signal to the destination station, it shifts to the protocol by the half duplex communication of the T.30 Recommendation. In this case, the half duplex communication protocol is executed from the sending of the NSF, CSI and DIS signals by the calling station.

By the above process, even if the full duplex communication protocol cannot be executed in the course of execution due to the reduction of the quality of the line, it is switched to the half duplex communication protocol and the remaining image signal is communicated by the half duplex communication protocol. Thus, the error termination in the course of communication is prevented and proper image communication is attained.

FIGS. 3A, 3B to FIG. 7 show flow charts of the control of the calling station (FIGS. 3A, 3B to FIG. 5) and the control of the called station (FIGS. 6 and 7) of the present embodiment.

Figure 3B:
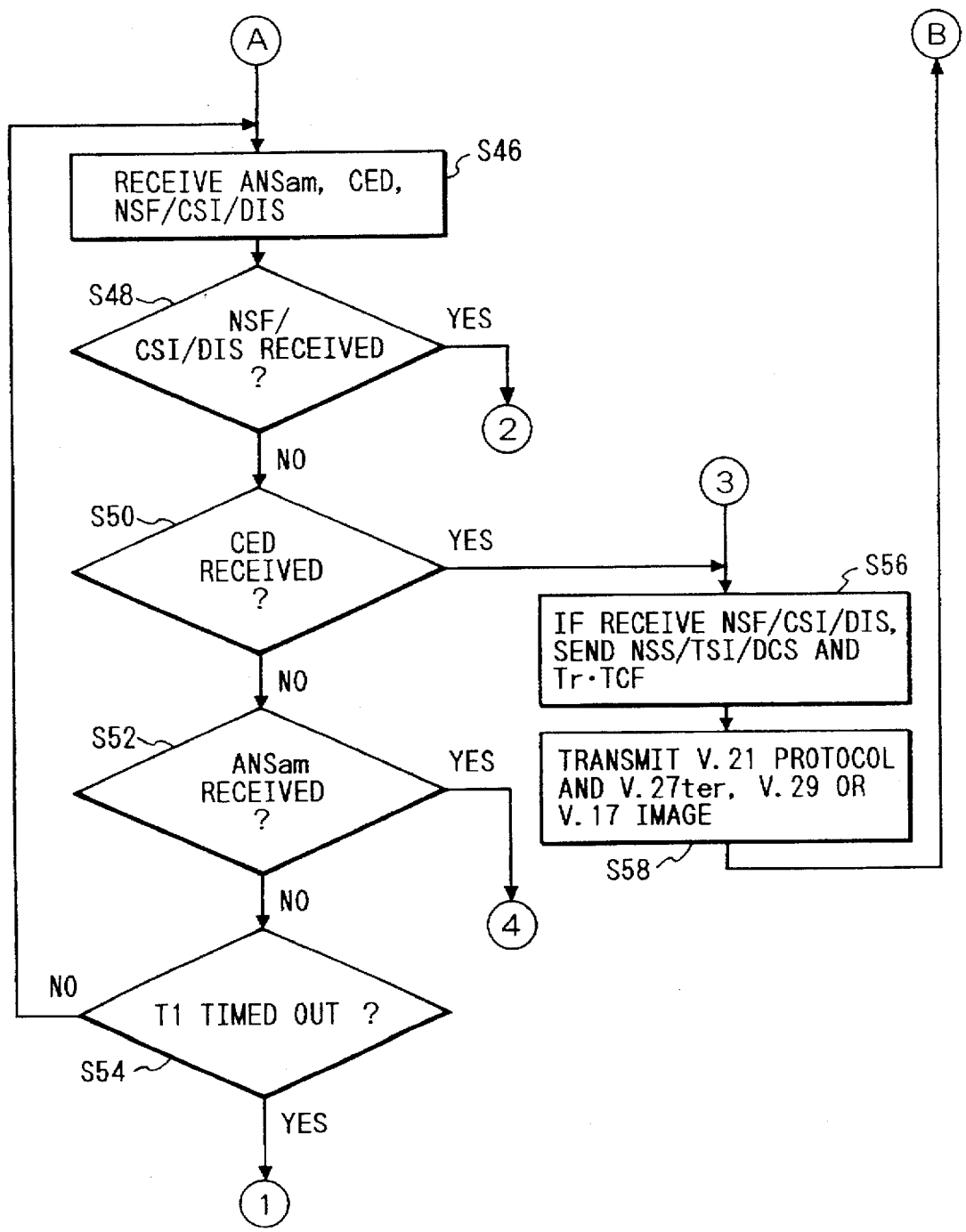

Referring to FIGS. 3A, 3B, a signal of a signal level '0' is outputted to the signal line 20a to turn off the CML in S32.

In S34, a signal of the signal level '0' is outputted to the signal line 20b to set the non-sending of the ANSam signal.

In S36 and S38, whether calling or receiving is selected is determined, and if the calling is selected, the process proceeds to S42, and if the receiving is selected, the process proceeds to S102. If none of the calling and the receiving is selected, the process proceeds to S40 to execute other process.

In S42, a signal of the signal level '1' is outputted to the signal line 20a to turn on the CML.

In S44, a timer T1 is set to 35 seconds.

In S46, the ANSam signal, the CED signal and the NSF/CSI/DIS signals are received, and in S48, S50, S52 and S54, the reception of the signals is confirmed. If the NSF/CSI/DIS signals (V.21 signal) are received, the process proceeds to S60, if the CES signal (2100 Hz signal) is received, the process proceeds to S56 and if the ANSam signal (2100 Hz signal modulated by 15 Hz) is received, the process proceeds to S64, and if T1 is not timed out, the process proceeds to S46 and if T1 is timed out, the process proceeds to S32.

In S56, when the NSF/CSI/DIS signals are received, the NSS/TSI/SCS signals and the Tr(training) TCF signals are sent.

In S58, the V.21 protocol and the image signal of the V.27ter, V.29 or V.17 are sent.

In S60, whether the called station receiver has the V.8 function or not is determined by the DIS signal, and if it has the V.8 function, the process proceeds to S62, and if it does not have the V.8 function, the process proceeds to S56.

In S62, the CI signal of the V.8 signal (which informs to the called station that the calling station is capable of the V.8 protocol) is sent.

In S64, when the ANSam signal is received, the process proceeds to S66 and starts to send the CM signal of the V.8 signal. At the same time, when the JM signal of the V.8 signal is received, the process proceeds to S78, and if the JM signal is not received, the process proceeds to S70.

In S70, whether the transmission of the CM signal is completed or not is determined, and if the transmission of the CM signal is completed, the process proceeds to S72 to receive the JM signal. In S74, whether the JM signal has been received or not is determined. If the JM signal has been received, the process proceeds to S78 to send the CJ signal of the V.8 signal. If the JM signal has not been received in S74, it means that the JM signal is not received during the sending of the CM signal and it is determined that the full duplex communication is not permitted and the process proceeds to S56 to execute the protocol in accordance with the V.21.

If the process proceeds to S78, it means that the JM signal has been received while transmission of the CM signal, and in S78, the CJ signal is received and the protocol and the image transmission in accordance with the V.34 are executed.

In S80, the line proving signal is transmitted and received, and in S82, whether the full duplex communication of the line proving signal is permitted or not is determined. If the full duplex communication is permitted, the process proceeds to S84 to execute the protocol and the image transmission in accordance with the V.34. If the full duplex communication of the line proving signal is not permitted in S82, the process proceeds to S56 to execute the protocol in accordance with the V.21.

In S84, the long training signal is transmitted.

In S86, the parameter exchange and the pre-protocol by the V.34 signal are executed, and in S88, whether the full duplex communication of the parameter exchange and the pre-protocol by the V.34 signal are permitted or not is determined. If the full duplex communication is permitted, the process proceeds to S90 to transmit the image by the V.34 (the image transmission is in the half duplex communication), and if the full duplex communication of the parameter exchange and the pre-protocol by the V.34 signal is not permitted, the process proceeds to S56 to execute the protocol in accordance with the V.21.

In S92, an intermediate protocol by the V.34 signal is represented. In S94, if the full duplex communication of the intermediate protocol by the V.34 signal is permitted, the process proceeds to S96, and if the full duplex communication of the intermediate protocol by the V.34 signal is not permitted (the acknowledge signal is not received within a predetermined period from the start of sending of the protocol signal), the process proceeds to S56 to execute the protocol in accordance with the V.21.

In S96, whether a next page is included or not is determined, and if the next page is included, the process proceeds to S98, and if the next page is not included, the process proceeds to S100 to execute a post protocol by the V.34 signal.

In S98, whether a mode change is included or not is determined, and if the mode change is included, the process proceeds to S86, and if the mode change is not included, the process proceeds to S90.

A control in the called station is now explained.

Figure 6:
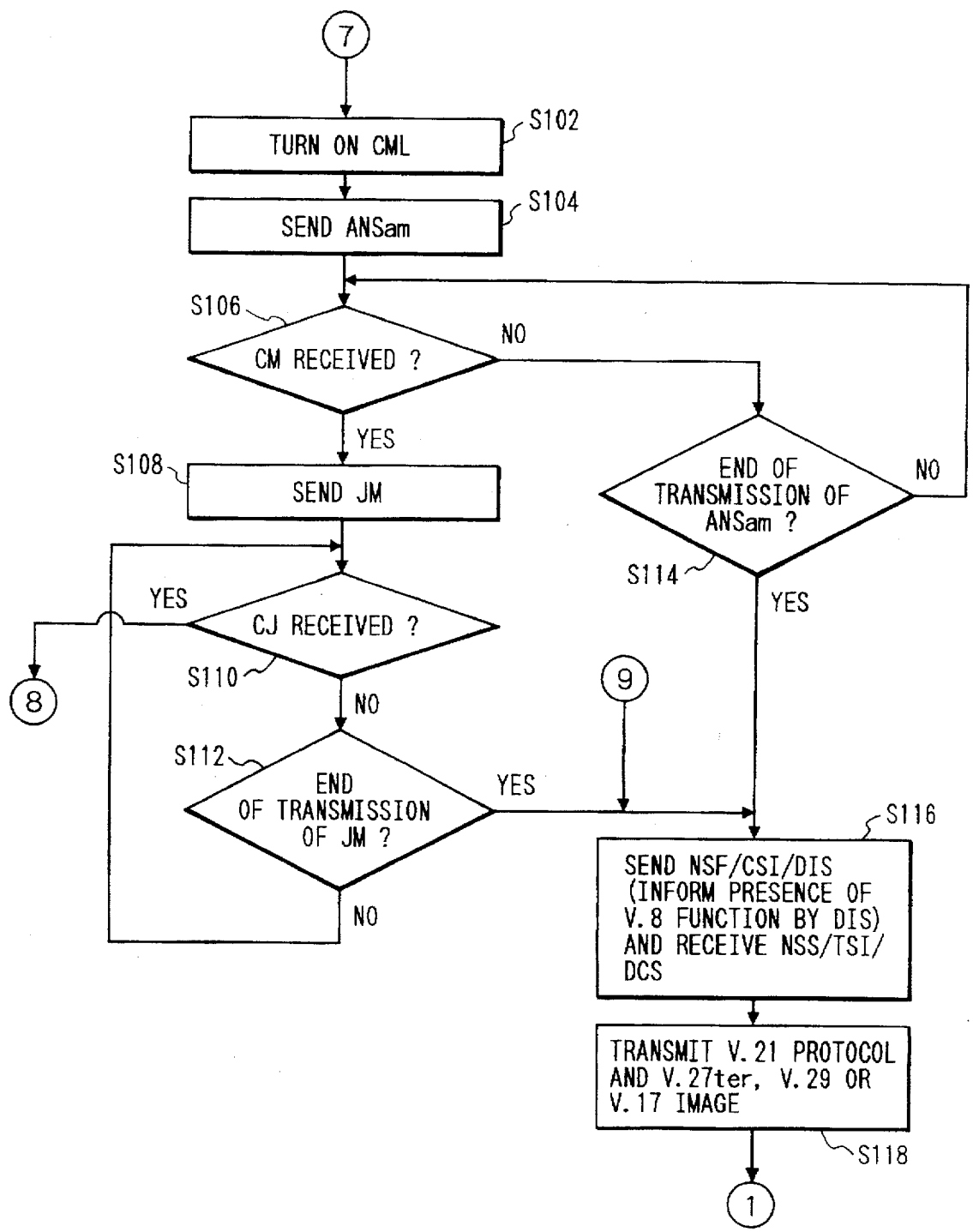
FIG. 6 shows a flow chart of a control operation of the embodiment.
Figure 7:
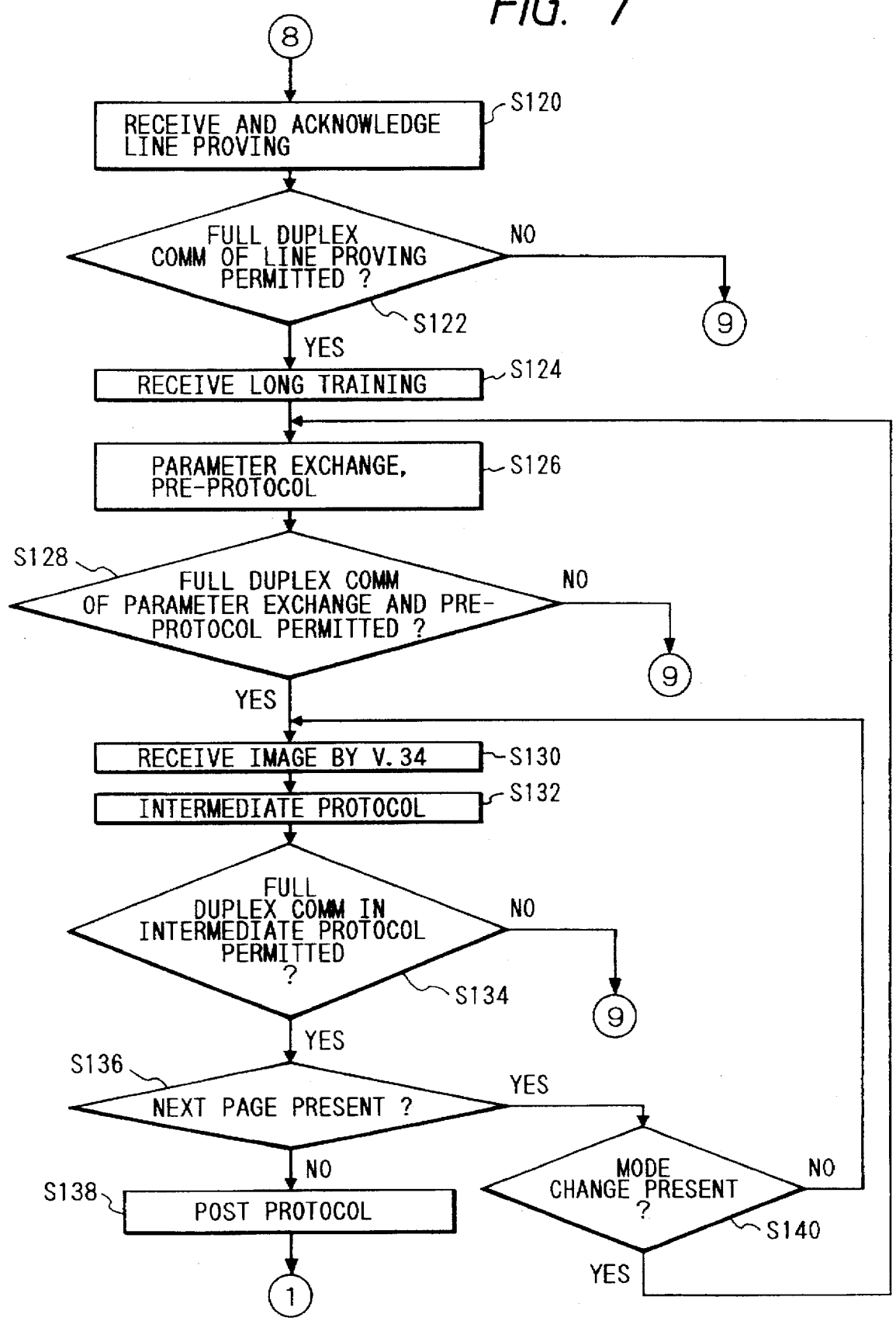
FIG. 7 shows a flow chart of a control operation of the embodiment.

In S102 of FIG. 6, a signal of the signal level '1' is outputted to the signal line 20a to turn on the CML.

In S104, the sending of the ANSam signal is started by the control from the signal line 20b.

In S106, the CM signal of the V.8 signal is received. If the CM signal is received before the end of the ANSam signal transmission (S114), the process proceeds to S108 to send the JM signal of the V.8 signal, and if the sending of the ANSam signal is terminated without receiving the CM signal, the process proceeds to S116.

When the process proceeds to S108, it means that the CM signal was received during the sending of the ANSam signal and the full duplex communication is permitted. Thus, in S108, the JM signal of the V.8 signal is sent, and if the CJ signal is received before the termination of the transmission of the JM signal, it means that the full duplex communication is permitted and the process proceeds to S120 to continue the reception of the V.34 protocol and the V.34 image signal, and if the transmission of the JM signal is terminated without receiving the CJ signal, it is determined that the full duplex communication is not permitted and the process proceeds to S116.

In S116, the NSF/CSI/DIS signals by the V.21 signal are transmitted. The presence of the V.8 function is informed to the transmitter by the DIS signal. Thereafter, the NSS/TSI/DCS signals are received by the V.21 signal and the process proceeds to S118 to receive the V.21 protocol and the image signal of the V.27ter, V.29 or V.17.

In S120, the line proving signal is received and the acknowledgement therefor is sent. In S122, if the full duplex communication of the line proving signal is permitted, the process proceeds to S124 to receive the long training signal, and if the full duplex communication of the line proving signal is not permitted, the process proceeds to S116.

In S124, the long training signal is received.

In S126, the parameter exchange and the pre-protocol by the V.34 signal are executed. In S128, if the full duplex communication of the parameter exchange and the pre-protocol by the V.34 signal is permitted, the process proceeds to S130 to shift to the reception of the image signal by the V.34. In S128, if the full duplex communication of the parameter exchange and the pre-protocol by the V.34 signal is not permitted, the process proceeds to S116.

In S132, the intermediate protocol by the V.34 signal is executed. In S134, if the full duplex communication of the intermediate protocol by the V.34 signal is permitted, the process proceeds to S136, and if the full duplex communication of the intermediate protocol by the V.34 signal is not permitted, the process proceeds to S116.

In S136, whether the next page is included or not is determined, and if the next page is included, the process proceeds to S140, and if the next page is not included, the process proceeds to S138 to execute the post protocol by the V.34 signal.

In S140, whether the mode change is included or not is determined, and if the mode change is included, the process proceeds to S126, and if the mode change is not included, the process proceeds to S130.

By the above process, the communication sequence shown in FIG. 2 are executed in the calling station and the called station.

[Embodiment 2]

Where means for registering whether the full duplex communication is permitted or not in accordance with the destination station and means for executing the protocol in the full duplex communication are provided, but where, when it is actually executed, the protocol operation in the full duplex communication is not permitted and the protocol is executed in the half duplex communication, it is registered in a registration memory 24 and a predetermined number of times (for example, ten times) of subsequent communications to the same destination are executed in the protocol of the half duplex communication.

Figure 8:
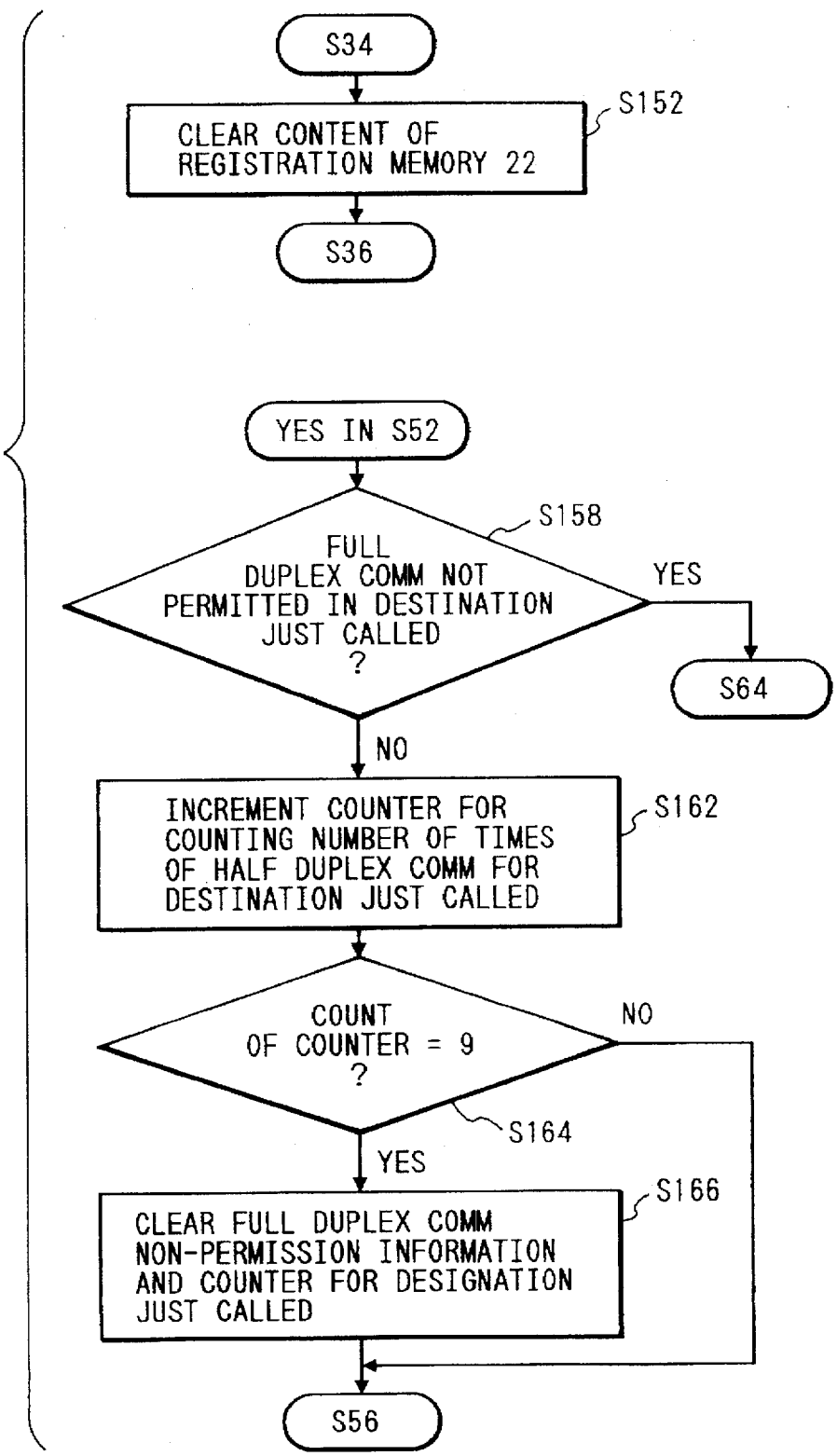
FIG. 8 shows a flow chart of a control operation of a second embodiment.
Figure 9:
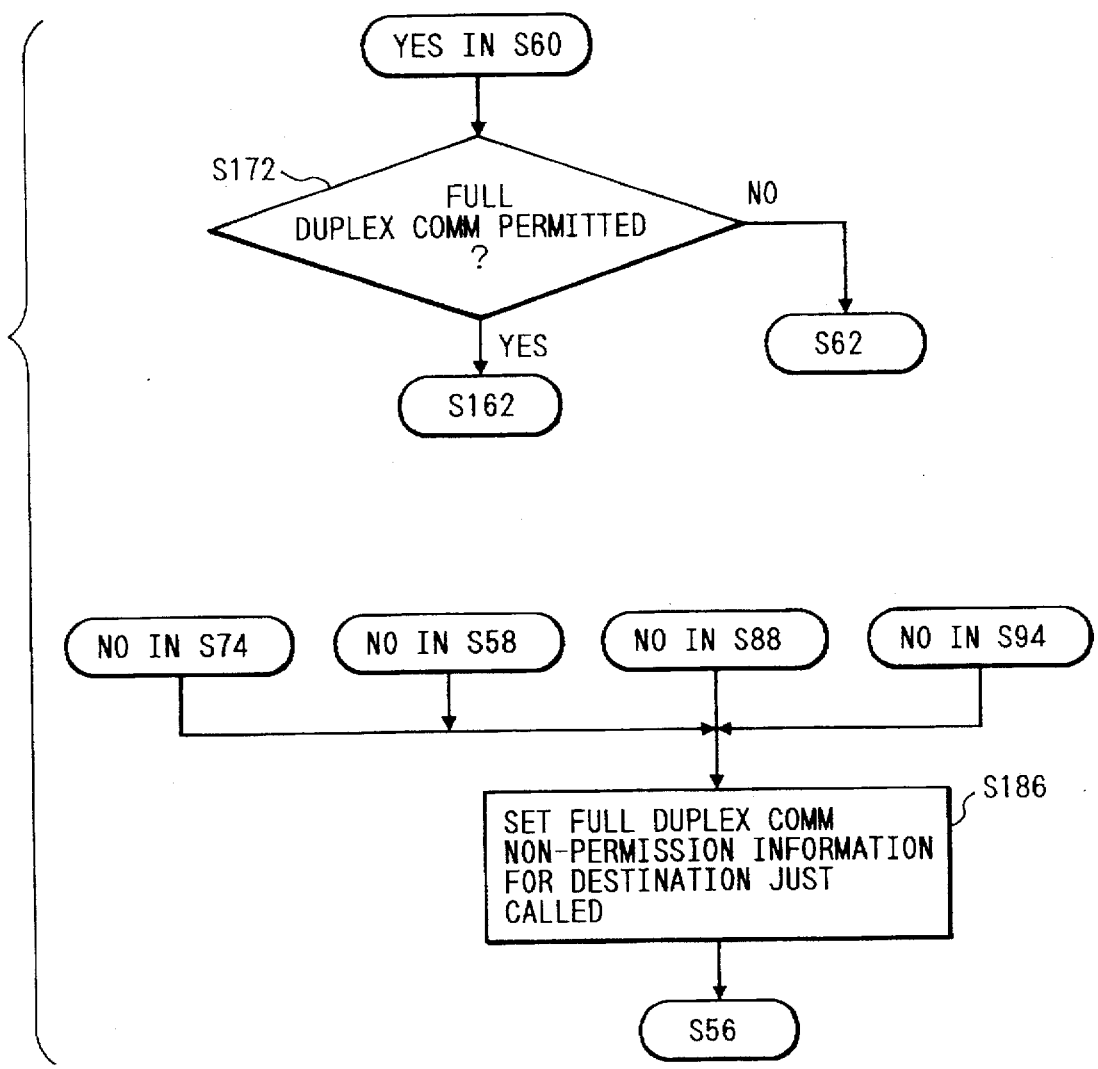
FIG. 9 shows a flow chart of a control operation of the second embodiment.

A flow of a portion of the control which is different from the flow chart of the control in the first embodiment (FIGS. 3A, 3B to FIG. 7) is shown in FIGS. 8 and 9.

In the second embodiment, an additional element to FIG. 1 is the registration memory 24 which corresponds to a one-touch dial and stores information on whether or not the protocol operation was executed in the half duplex communication because the protocol operation in the full duplex communication was not actually permitted in spite of the fact that the function to execute the protocol in the full duplex communication is provided. The registration memory 24 further serves as a counter to count the predetermined number of times for which the communications to the same destination after the execution of the protocol operation in the half duplex communication are executed in the protocol of the half duplex communication, and it is accessed through a signal line 24a. The second embodiment is explained only for the difference from the first embodiment and the line elements are designated by the like numerals and the explanation thereof is omitted.

As shown in FIG. 8, a step S152 is inserted between S34 and S36 of FIG. 3A. In S152, the content of the registration memory 24 is cleared.

Steps S158, S162, S164 and S166 are inserted between the YES of S52 of FIG. 3B and S64 of FIG. 4A.

In S158, the information of the registration memory 24 is checked to determine whether full duplex communication non-permission information is set in the destination just called or not, and if it is set, the process proceeds to S162, and if it is not set, the process proceeds to S64.

In S162, the counter (the data of the registration memory 24) which counts the number of times of the half duplex communication for the destination just called is incremented by one.

In S164, whether the count of the counter incremented in S162 is 9 or not is determined, and if it is 9, the process proceeds to S166, and the full duplex communication non-permission information for the destination just called and the counter for counting the number of times of the half duplex communication, stored in the registration memory 24 are cleared.

As shown in FIG. 9, a step S172 is inserted between the YES of S60 to S62 of FIG. 4A. The step S172 is similar to S158, and if YES in S172, the process proceeds to S162, and if NO, the process proceeds to S62.

Figure 4B:
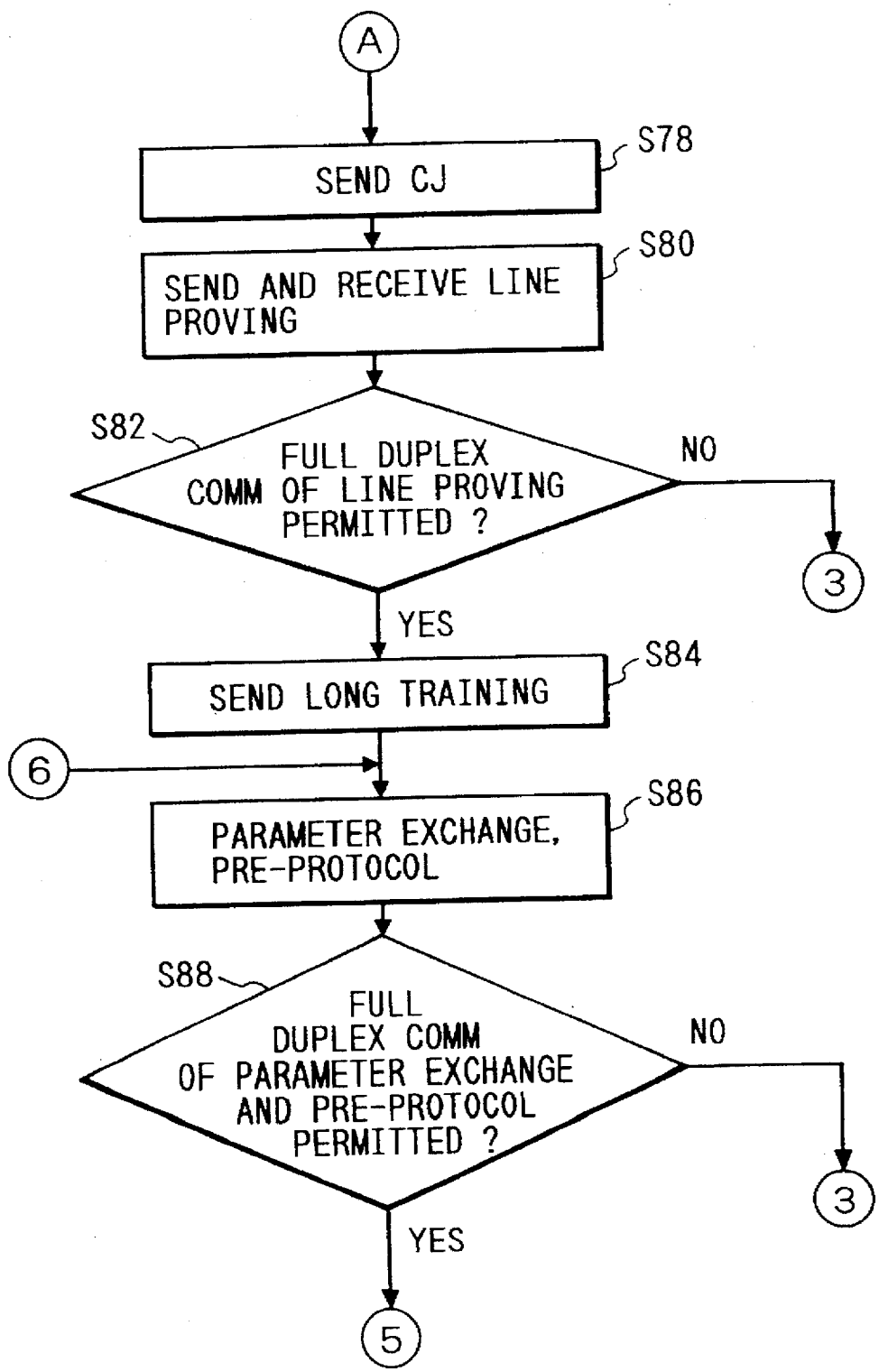
Figure 5:
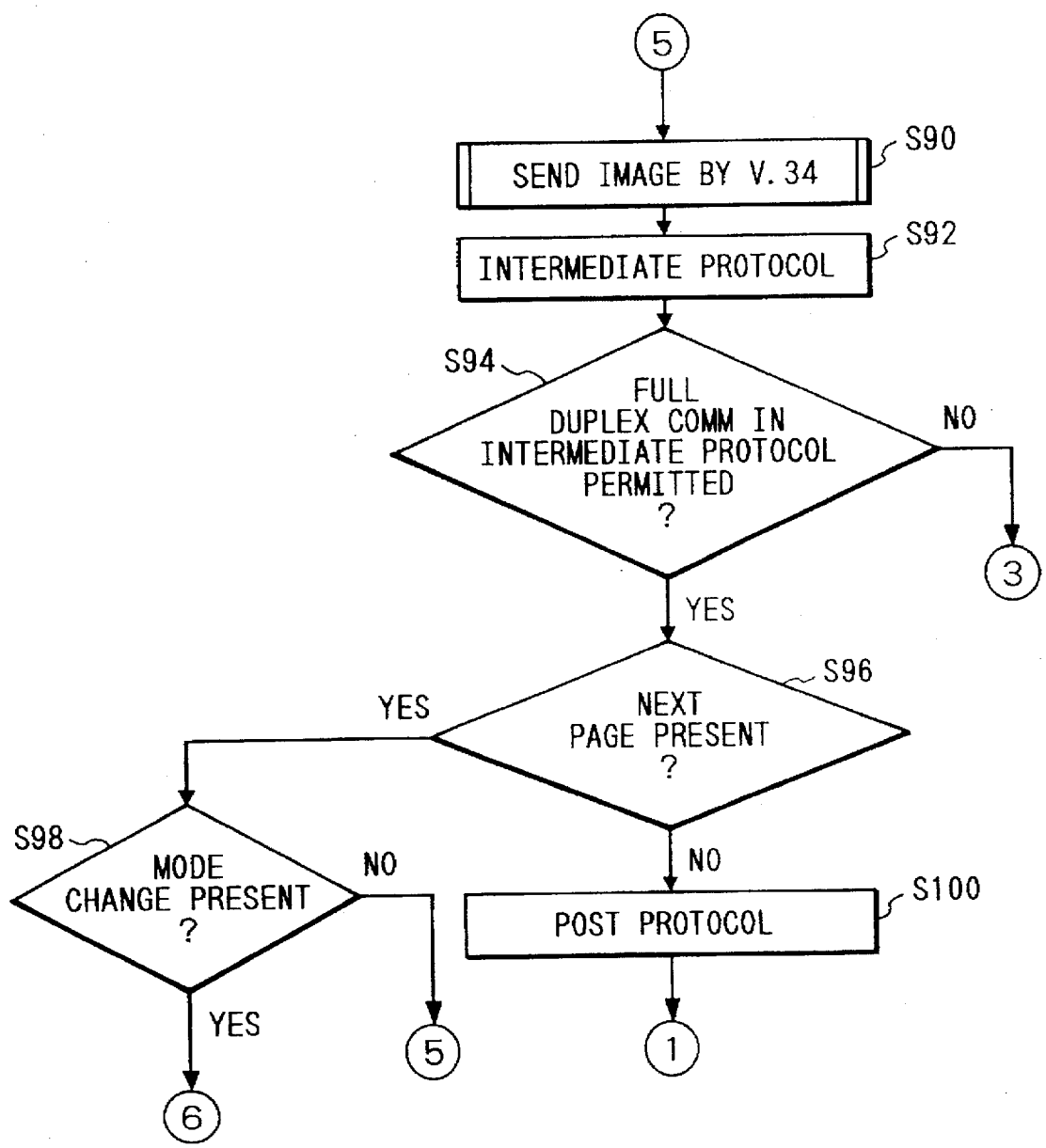
FIG. 5 shows a flow chart of a control operation of the embodiment.

Further, a step S186 is inserted between the NO of S74, the NO of S82 and the NO of S88 of FIGS. 4A and 4B and the NO of S94 of FIG. 5, and S56 of FIG. 3B.

In S186, the full duplex communication non-permission information for the destination just called is set in the registration memory In the present embodiment, the protocol by the half duplex communication is explained for V.21, V.29, V.27ter and V.17 of the T.30 although the V.8 and V.34 may be executed by the half duplex communication.

As described above, when the full duplex communication is permitted, the V.8 and V.34 protocols and the V.34 image transmission are executed, and when the full duplex communication is not permitted, it is determined that the line was disconnected in the course of communication and the V.21 protocol and the V.27ter, V.29 or V.17 image transmission by the half duplex communication are executed without error termination. Thus, a probability of success of communication is enhanced.

The selection of the full duplex communication protocol and the half duplex communication protocol for the destination may be more efficiently executed by the learning effect.

In accordance with the present embodiment, when the protocol by the full duplex communication is not executable in the course of the communication, it is shifted to the protocol by the half duplex communication to continue the data communication so that the error termination in the course of communication is prevented and proper data communication is attained.

Further, the execution of the protocol by the full duplex communication and the execution of the protocol by the half duplex communication can be efficiently selected.

[Embodiment 3]

In the Embodiment 3, only a difference from the Embodiment 1 is explained and the line elements are designated by the like numerals and the explanation thereof is omitted.

Figure 10:
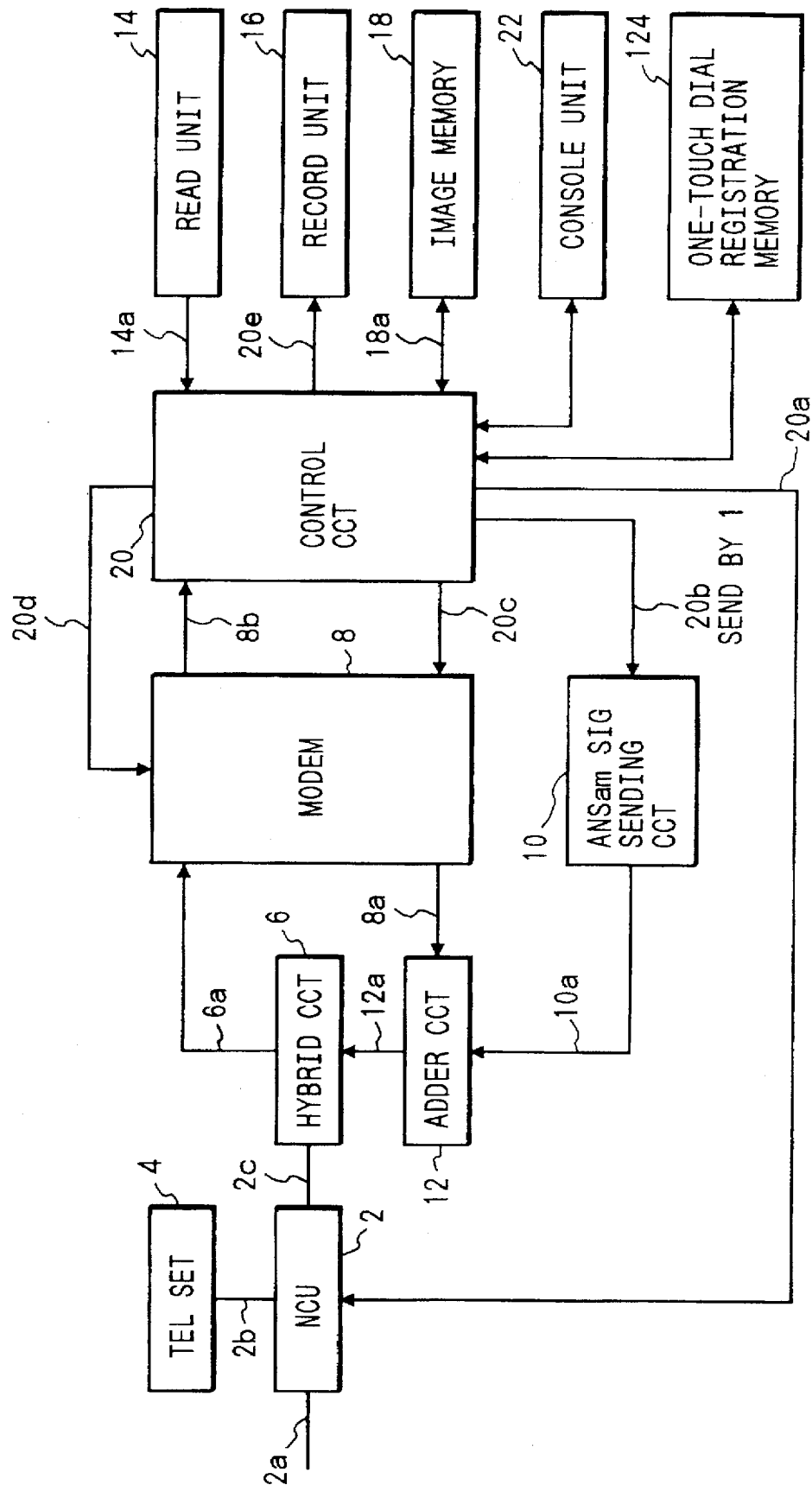
FIG. 10 shows a block diagram of a configuration of a facsimile apparatus in accordance with a third embodiment.

In the Embodiment 3, a memory 124 registering the one-touch dial is provided as shown in FIG. 10.

The present embodiment is briefly explained.

Figure 11:
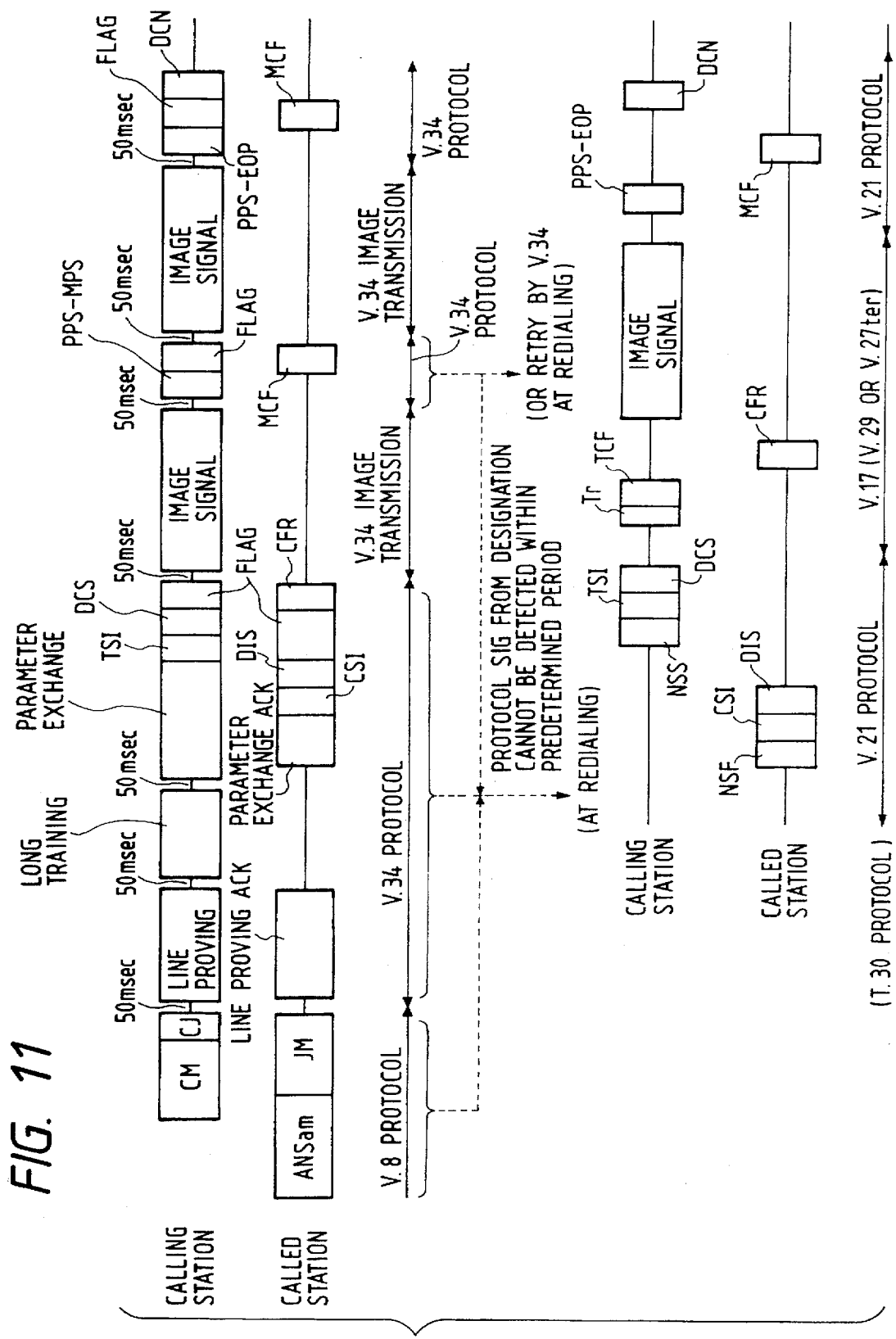
FIG. 11 shows a communication sequence in the third embodiment, FIG. 12, comprised of FIGS. 12A and 12B, shows a flow chart of a control operation of the third embodiment, FIG. 13, comprised of FIGS. 13A and 13B, shows a flow chart of a control operation of the third embodiment, FIG. 14, comprised of FIGS. 14A and 14B, shows a flow chart of a control operation of the third embodiment.

FIG. 11 shows a communication sequence of the present embodiment.

FIG. 11 differs from FIG. 2 in the following points.

In the initial protocol (line proving exchange to CFR communication) of the V.8 and V.34 protocol, if the calling station or the called station does not receive the acknowledge signal for the protocol signal it sent out within a predetermined period from the start of the sending of the protocol signal to the destination, the communication is stopped at that time point and the protocol shifts to the redialing (retry). In the redialing, the communication is retried by the protocol by the half duplex communication in accordance with the T.30 Recommendation. In this case, the half duplex communication protocol is executed from the sending of the NSF/CSI/DIS signals by the called station because, if the V34 protocol cannot be executed when the mode is set by the modem, it is likely that the quality of the line to the destination station is bad. If the acknowledge signal to the sent protocol signal is not received in the intermediate protocol between pages or the post protocol, it is determined that the quality of the line temporarily reduced by the affect of noise and the communication is terminated at that time point and the V.34 protocol is retried at the redialing.

By the above process, even if the protocol by the full duplex communication becomes inexecutable in the course of the communication due to the reduction of the quality of the line, it is switched to the protocol by the half duplex communication at the retry and the image signal is communicated by the half duplex communication protocol. Thus, the proper communication is attained without executing a complex process of switching the protocol system in the course of communication.

FIGS. 12A, 12B to FIG. 17 show control of the calling station (FIGS. 12A, 12B to FIG. 15) and control of the called station (FIGS. 16 and 17) of the Embodiment 3.

Figure 12B:
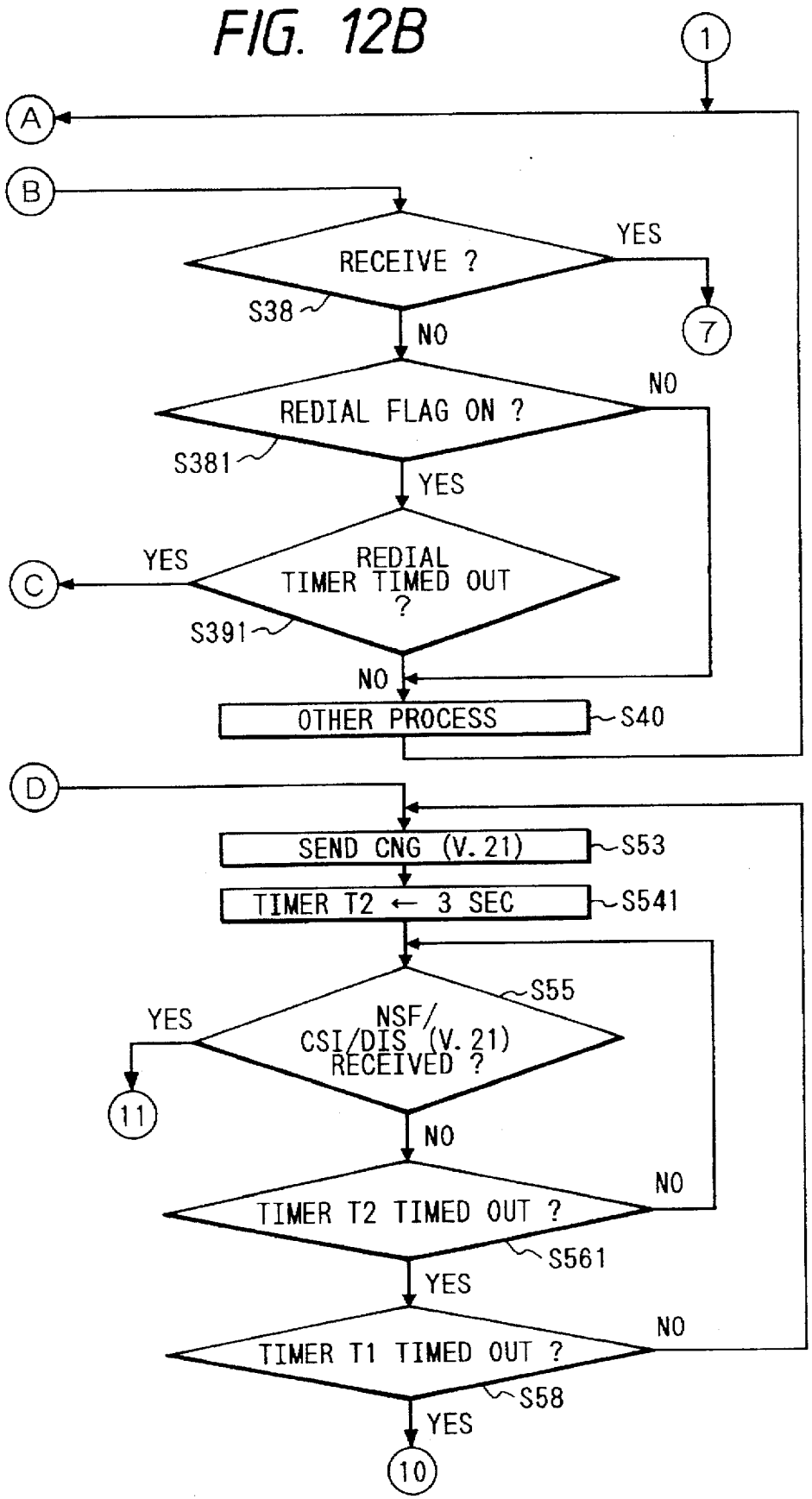
Figure 13B:
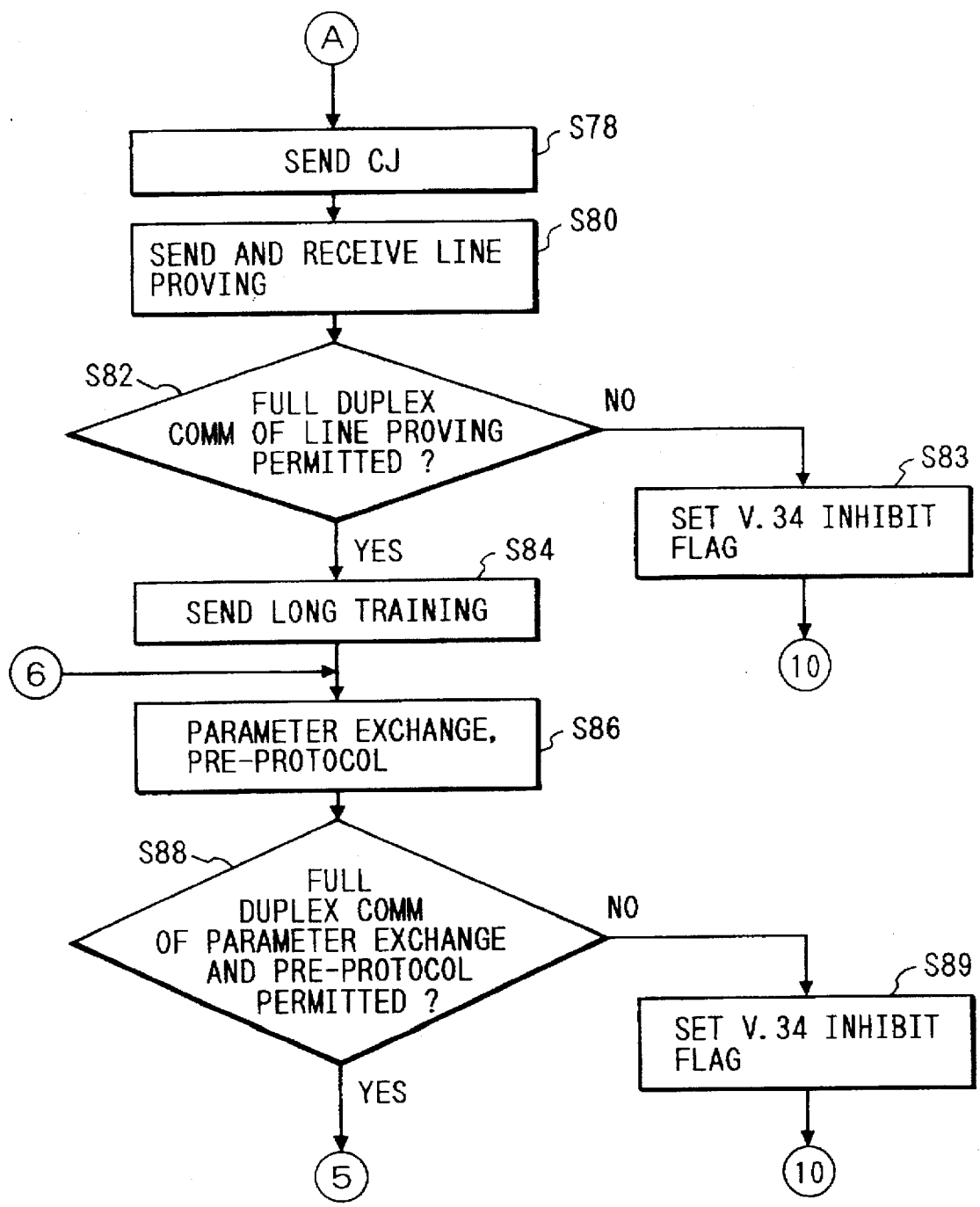
Figure 14A:
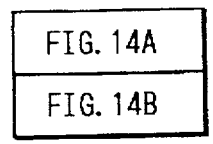
Figure 14A:
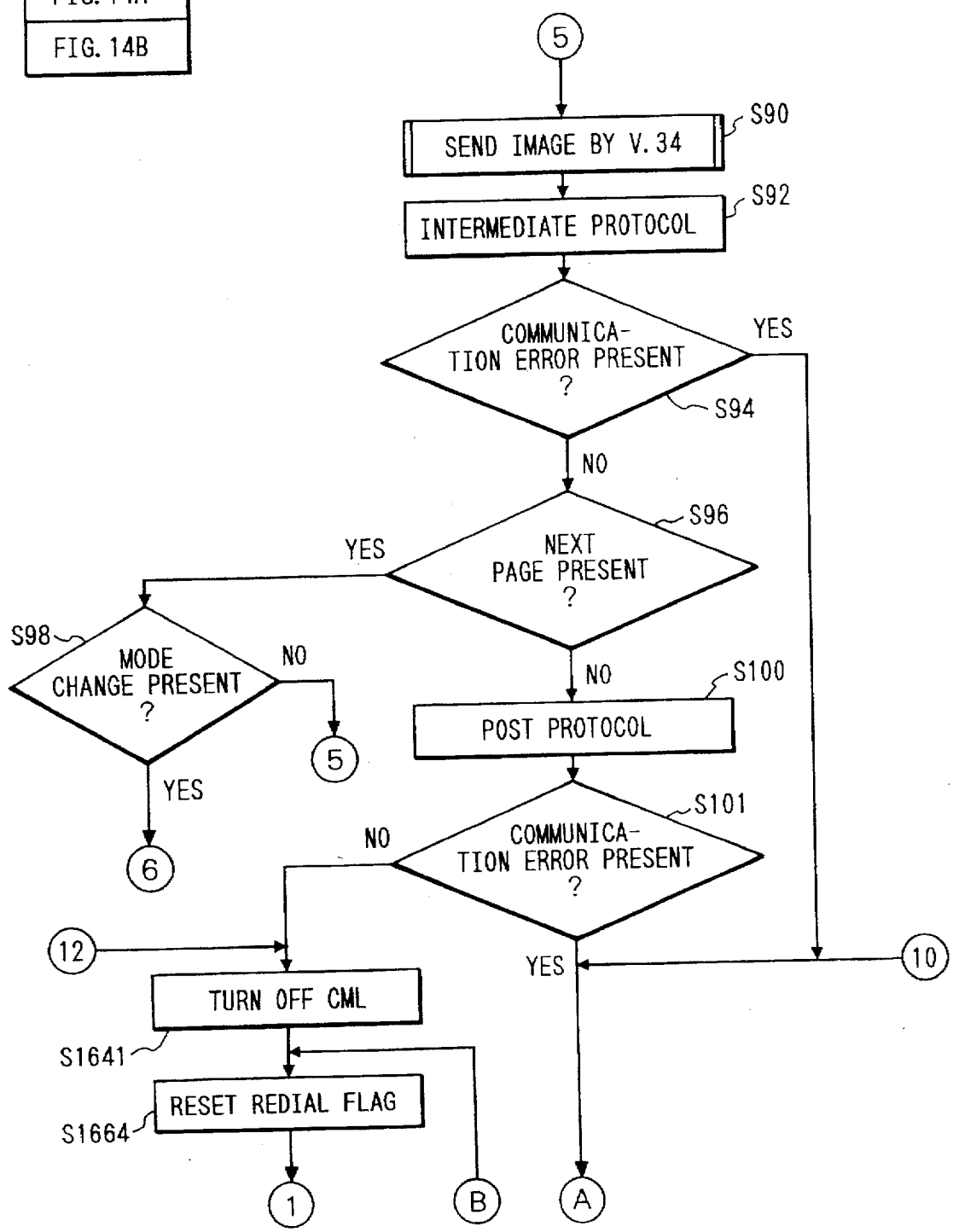
Figure 14B:
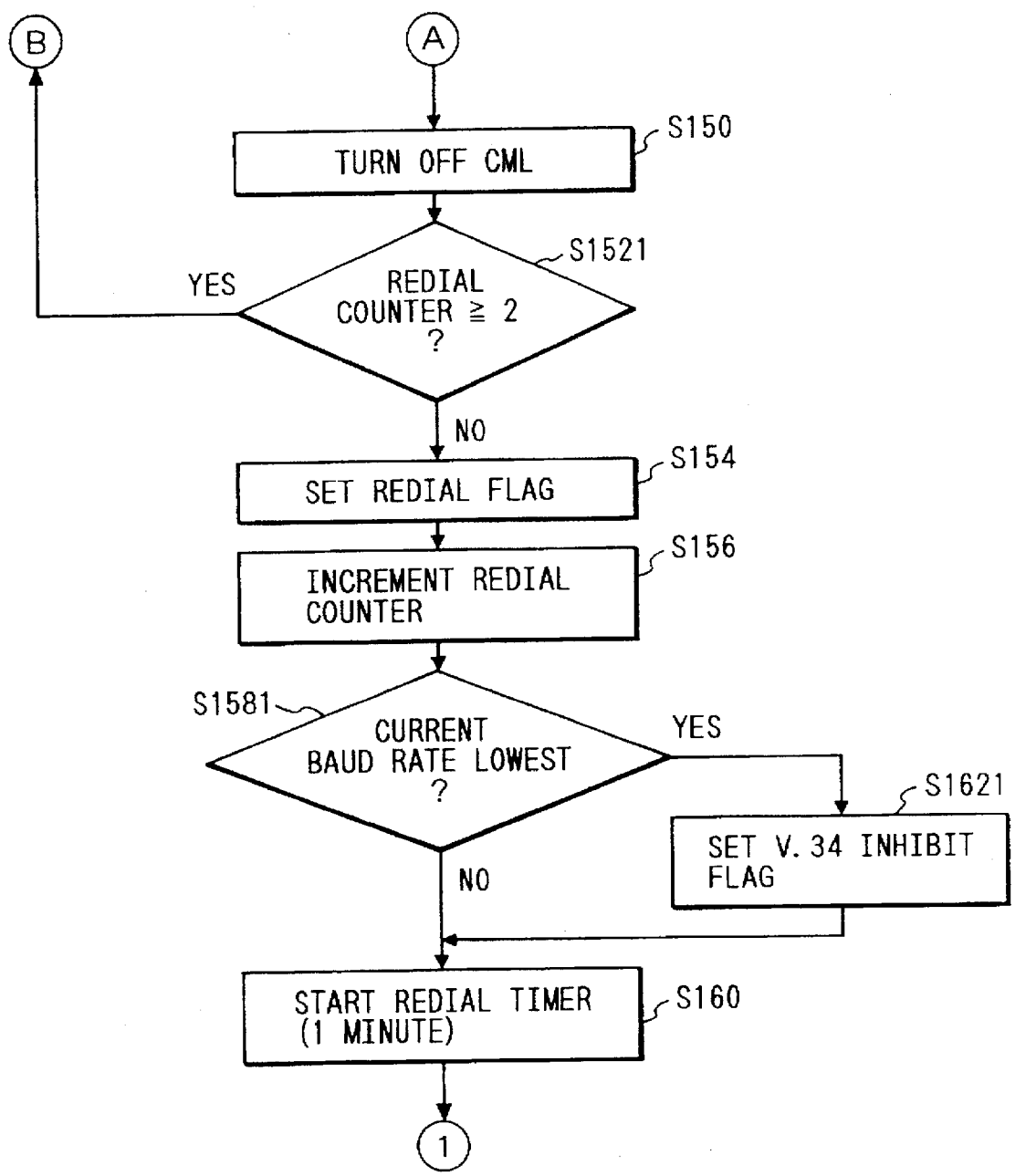
Figure 15:
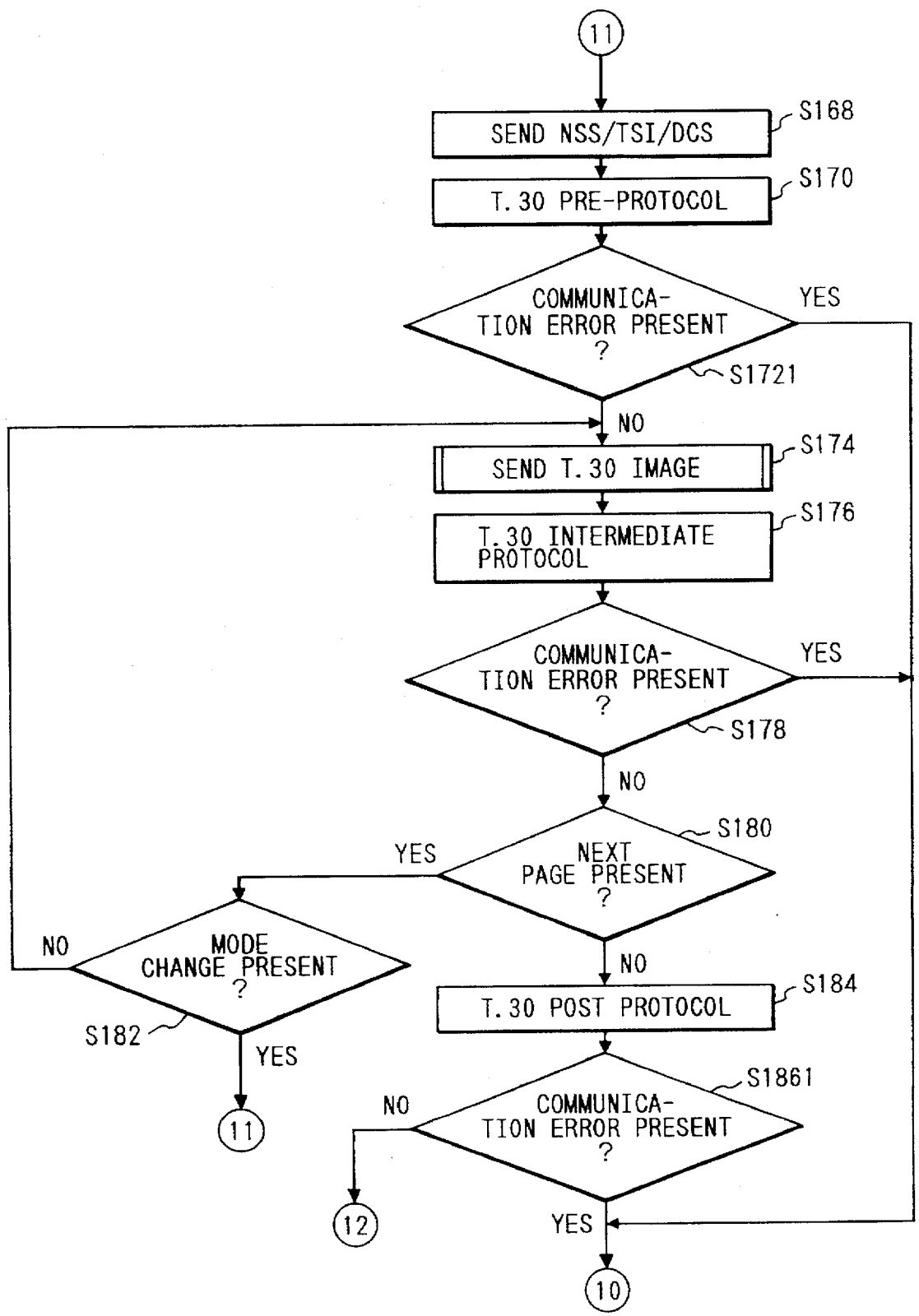
FIG. 15 shows a flow chart of a control operation of the third embodiment.
Figure 16:
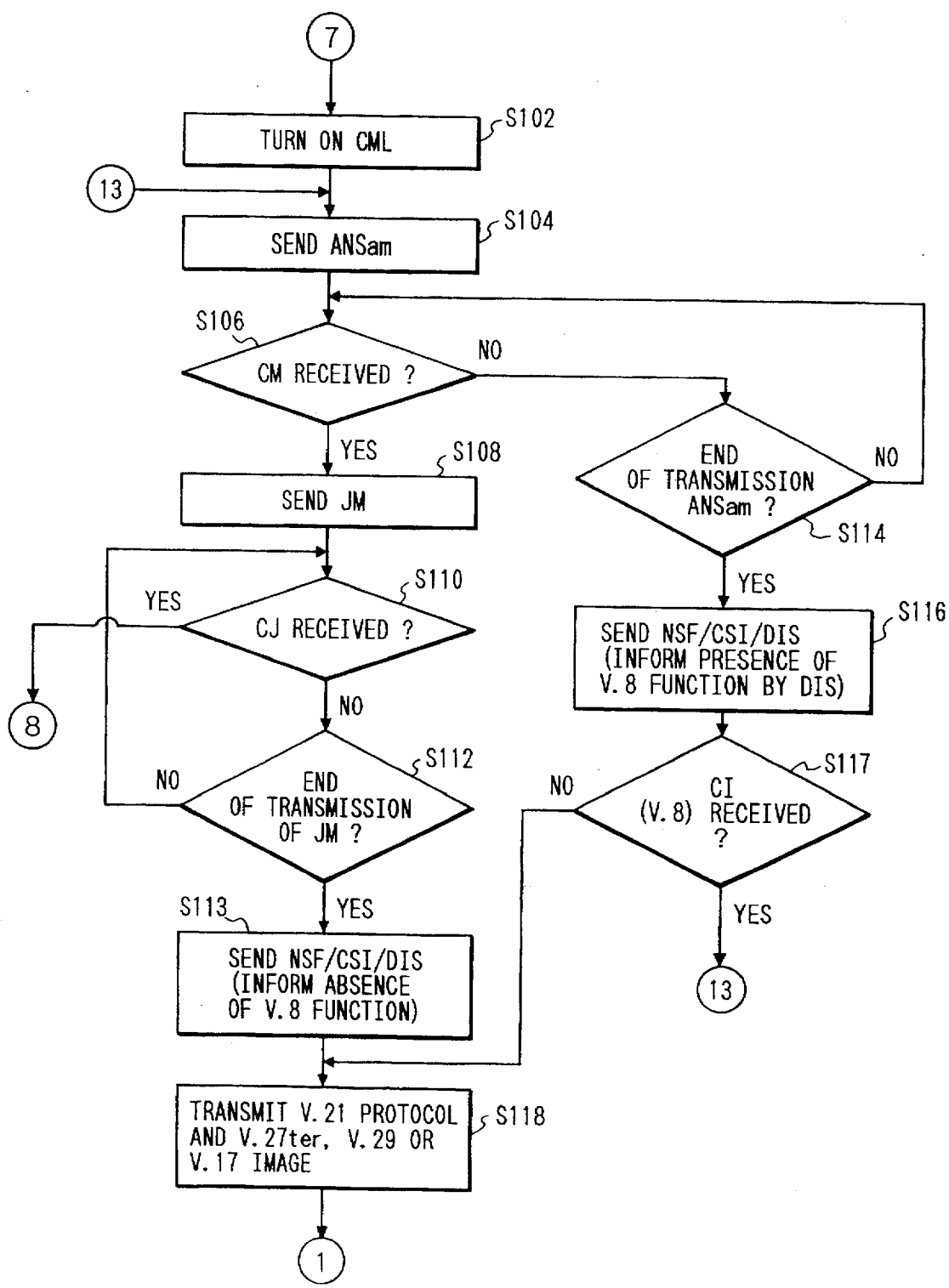
FIG. 16 shows a flow chart of a control operation of the third embodiment.
Figure 17:
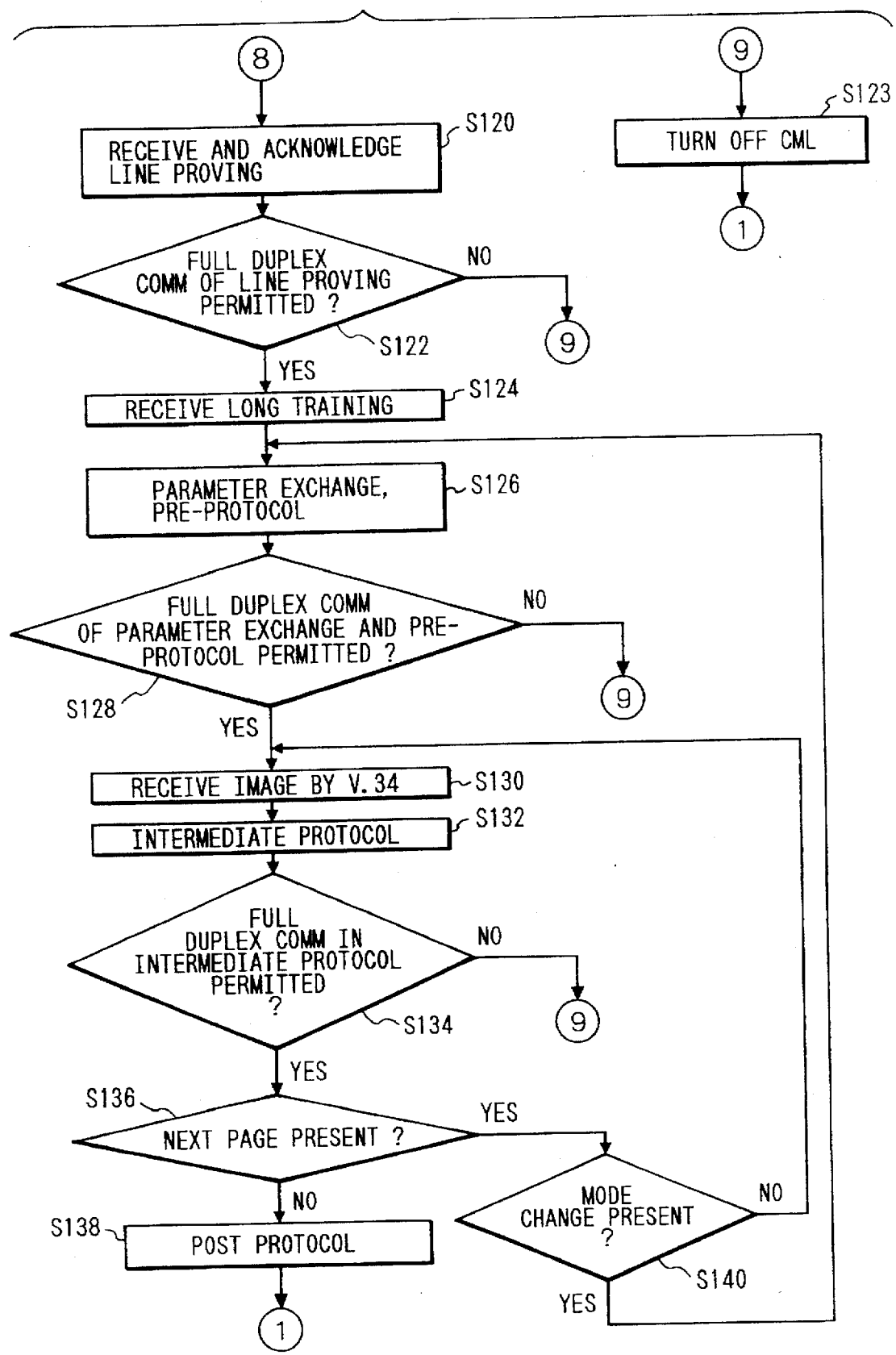
FIG. 17 shows a flow chart of a control operation of the third embodiment.

In FIGS. 12A and 12B, initialization of the NCU 2, the modem 8 and the ANSam signal sending circuit 10 is executed in S321.

In S381, whether a redial flag in a RAM of the control circuit 20 is set or not is determined, and if it is set, the process proceeds to S391 to determine whether an interval timer for redialing (one-minute timer) is timed out or not. If it is not timed out (or the redial flag is not set), the process proceeds to S40 to execute other process.

In S42, a signal of the signal level '1' is outputted to the signal line 20a to turn on the CML, and a telephone number of the destination station stored in the dialing register is sent to the signal line 2a as the dialing signal by using a DTMF signal generator in the modem 8 or the dialer in the NCU 2.

In S45, whether a V.34 inhibit flag in the RAM is set or not is determined, and if it is not set, the process proceeds to S46, and if it is set, the process proceeds to S53. The V.34 inhibit flag is provided for the redial number and each of the one-touch dial keys (see FIG. 18).

In S54, if T1 is not timed out, the process proceeds to S46, and if T1 is timed out, the process proceeds to S150.

In S53, the CNG signal is sent in the V.21 mode, and in S541, the timer T2 is set to 2 seconds, and in S55 and S561, the reception of the NSF/CSI/DIS signals is checked before the time-out of the timer T2. In S55, if the NSF/CSI/DIS signals are received, the process proceeds to S168, and if the timer T2 is timed out, the time-out of the timer T1 is checked in S58, and if the timer T1 is not timed out, the process returns to S53, and if it is timed out, the process proceeds to S150.

In S60, whether the receiver of the destination station has the V.8 function or not is determined by the DIS signal, and if it has the V.8 function, the process proceeds to S62, and if it does not have the V.8 function, the process proceeds to S75.

In S74, the reception of the JM signal is checked. If the JM signal is received, the process proceeds to S78 to send the CJ signal of the V.8 signal. If the JM signal is not received in S74, the process proceeds to S75. This indicates that the JM signal is not received in the course of the transmission of the CM signal and it is determined that the full duplex communication is not permitted and the process proceeds to S75. In S75 and S77, whether the NSF/CSI/DIS signals have been received before the time-out of the timer T1 or not is determined, and if the NSF/CSI/DIS signals are received, the process proceeds from S75 to S168 to execute the protocol in accordance with the V.21. When the timer T1 is timed out, the process proceeds from S77 to S150.

In S82, whether the full duplex communication of the line proving signal is permitted or not is determined, and if it is permitted, the process proceeds to S84. If the full duplex communication of the line proving signal is not permitted in S82, the process proceeds to S83 to set the V.3 inhibit flag for the redial telephone set (or the one-touch dial key) and the process proceeds to S150.

In S88, whether the full duplex communication of the parameter exchange and the pre-protocol of the V.34 signal is permitted or not is determined, and if the full duplex communication is permitted, the process proceeds to S90. On the other hand, if the full duplex communication of the parameter exchange and the pre-protocol of the V.34 signal is not permitted, the process proceeds to S89 to set the V.34 inhibit flag for the redial telephone number (or the one-touch dial key) and the process proceeds to S150.

In S94, the presence or absence of the communication error is determined, and if the communication error is absent (or if the full duplex communication of the intermediate protocol by the V.34 signal is permitted), the process proceeds to S96, and if the communication error is present (or if the full duplex communication of the intermediate protocol by the V.34 signal is not permitted (that is, the acknowledge signal is not received within the predetermined period from the start of the sending of the protocol signal)), the process proceeds to S150.

In S101, the presence or absence of the communication error in the post protocol is determined. If the communication error is absent, the CML relay of the NCU 2 is turned off in S1641, and in S1661, the redial flag in the RAM and the redial counter are reset and the process returns to S36. If the communication error is present in S94 or S101, the CML relay is turned off in S150, and in S1521, whether the count of the redial counter is no smaller than 2 or not is determined. If the count is no smaller than 2, the process proceeds to S1661. If the count is smaller than 2, the process proceeds to S154 to set the redial flag, and in S156, the redial counter is incremented. In S158, if the image transmission by the V.34 terminates with error in the course of transmission, whether the baud rate of the V.34 of the modem 8 is the lowest baud rate at the time of the error termination or not is determined. If it is not the lowest baud rate, the interval timer (one-minute) for the redialing is started in S160 and the process returns to S36. If it is the lowest baud rate, it is determined that a possibility to success in the communication by the V.34 at the next retry is low and the V.34 inhibit flag is set in S1621 and the process proceeds to S160. The steps S1581 and S1621 may be omitted. In S1581, the parameter for setting the baud rate of the modem 8 may be set such that the modem 8 sets to a lower baud rate the baud rate at which the error termination occurred. Thus, a probability of success of the communication at the retry by the V.34 is enhanced.

When the process proceeds from S55 and S75 to S168 to execute the conventional T.30 protocol, the NSS/TSI/DCS signals are transmitted, and in S170, the remaining pre-protocol of the T.30 (the training check sequence and the reception of the CFR/FTT signals) is executed. In S1721, whether the communication error has occurred in the pre-protocol or not is determined, and if the communication error occurs, the process proceeds to S150. If the communication error is absent in S1721, the image transmission by the T.30 (the image transmission by the V.29, V.27ter and V.17) is conducted in S174 and when one page of transmission is completed, the intermediate protocol (the interpage protocol) is executed in S176. In S178, the presence or absence of the communication error is checked, and if the communication error is present, the process proceeds to S150, and if the communication error is absent, the presence or absence of the next page is checked in S180. In S180, if the next page is absent, the post protocol by the T.30 is executed in S184, and if the next page is present, the presence or absence of the mode change request is checked in S182. If the mode change request is absent, the process returns to S174, and if the mode change request is present, the process returns to S168. In S1861, the presence or absence of the errors in the post protocol is checked, and if the error is present, the process proceeds to S150 and if the error is absent, the process proceeds to S1641.

A control in the called station is now explained.

In S113, information indicating the lack of the V.8 function is set in the NSF/CSI/DIS signals and the NSF/CSI/DIS signals are sent. The process proceeds to S118.

In S116, the NSF/CSI/DIS signals by the V.21 signal are sent. The presence of the V.8 function is informed by the DIS signal. In S117, the reception of the CI signal (of the V.8 signal) is checked, and if the CI signal is not received the NSS/TSI/DCS signals are subsequently received by the V.21 signal in S118, and the V.21 protocol and the V.27ter, V.29 or V.17 image signal are received.

In S122, if the full duplex communication of the line proving signal is permitted, the process proceeds to S124, and if the full duplex communication of the line proving signal is not permitted, the CML relay is turned off in S123 and the process returns to S36.

In S128, if the full duplex communication of the parameter exchange and the pre-protocol by the V.34 signal is permitted, the process proceeds to S130, and if the full duplex communication of the parameter exchange and the pre-protocol by the V.34 signal is not permitted in S128, the process proceeds to S123.

In S134, if the full duplex communication in the intermediate protocol by the V.34 signal is permitted, the process proceeds to S136, and if the full duplex communication in the intermediate protocol by the V.34 signal is not permitted, the process proceeds to S123.

By the above process, the communication sequence shown in FIG. 11 is executed in the calling station and the called station.

Figure 18:
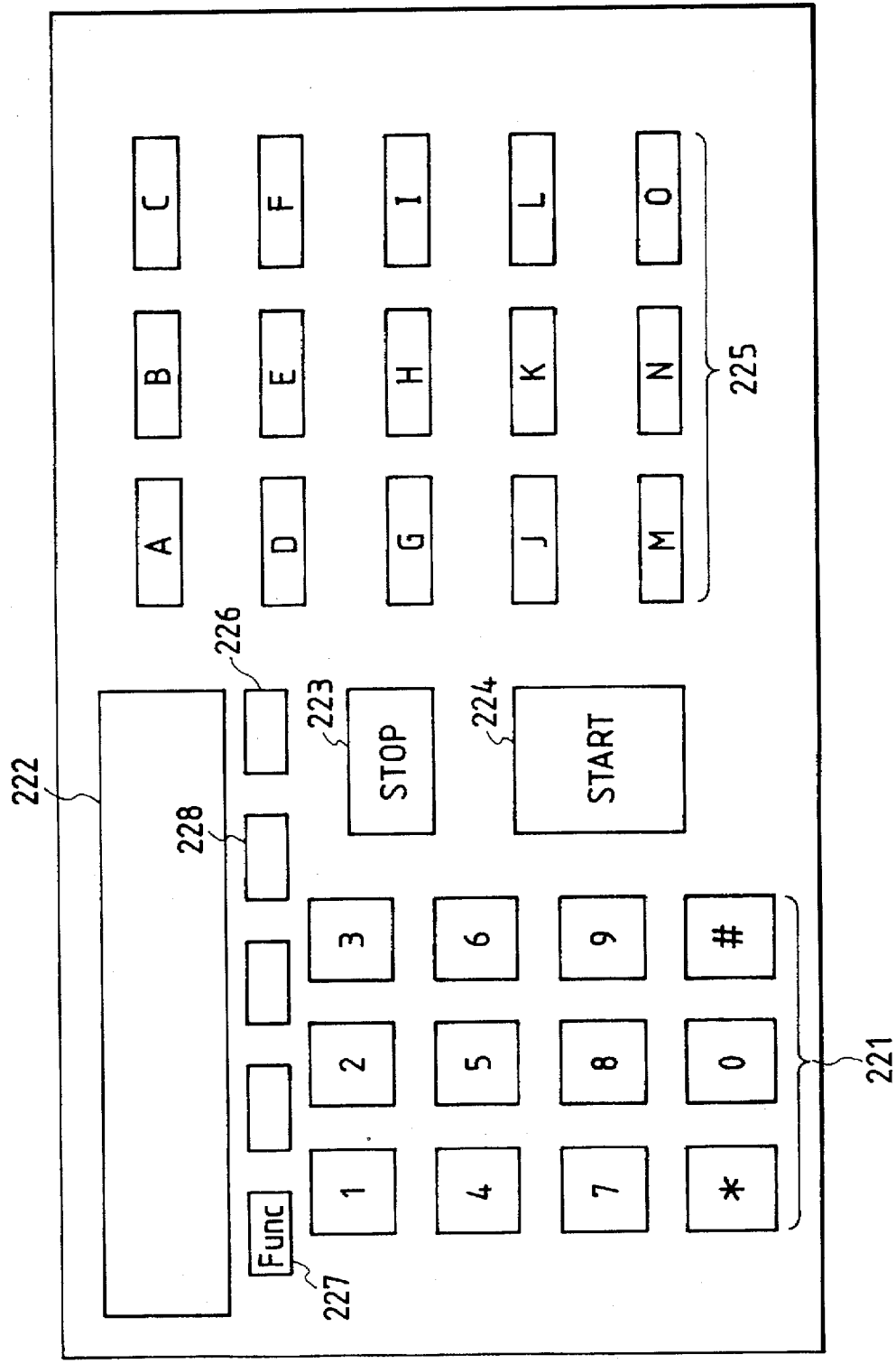
FIG. 18 shows a console unit 22.

FIG. 18 shows various keys of the console unit 22 and the LCD 222.

Numeral 226 denotes an inhibit key for setting the V.34 inhibit flag.

In FIG. 10, numeral 124 denotes a registration memory for registering the telephone number, the name and the on/off of the V.34 inhibit flag for the one-touch dial key 225.

[Embodiment 4]

In the Embodiment 3 described above, the V.34 inhibit flag is automatically set in accordance with the content of the error of the V.34 protocol.

In the present embodiment, the information on the success ratio (NUMBER OF TIMES OF SUCCESS/NUMBER OF TIMES OF COMMUNICATIONS) of the V.34 protocol in the past ten times (ten times maximum) of communication is associated with the one-touch dial key and the information on the success ratio is displayed on the LCD 222. The operator may set the V.34 inhibit flag while he watches the information on the success ratio.

FIG. 19 shows the content of the one-touch dial registration memory 124 when the V.34 inhibit flag is set by the inhibit key 226.

In FIG. 19, the one-touch dial key N has information indicating that the destination station does not have the V.34 function stored in the area of the success ratio data.

FIG. 20 shows a flow chart of a control operation of the control circuit 20 when the V.34 inhibit flag is set by the manual operation by the inhibit key 226.

The set mode of FIG. 11 is executed in accordance with the input of the function key 227 of FIG. 18.

In S200 of FIG. 20, the input of the designation of the one-touch key dial of interest is monitored, and when the input of designation of the one-touch dial key is detected, the information on the success ration of the V.34 protocol for the designated one-touch dial key is read from the registration memory in S202, and it is displayed on the LCD 222. The operator sets the V.34 inhibit flag by the inhibit key 226 or resets the V.34 inhibit key by the clear key 228 while he watches the information on the success ratio displayed on the LCD 222. The set mode is terminated by the stop key 223.

In S204, S206 and S208, the presence or absence of the entry of the inhibit key 226, the stop key 223 and the clear key 228 is determinated, and the V.34 inhibit flag of the one-touch dial key is set in accordance with the entry of the inhibit key 226 in S212 and the V.34 inhibit key is reset in accordance with the clear key 228 in S210.

In accordance with the present embodiment, when the high rate protocol by the full duplex communication is not permitted due to the reduction of the quality of the line to the destination station, proper communication may be attained by the protocol by the half duplex communication. Further, when it is detected in the course of communication that the high rate protocol by the full duplex communication is not permitted, the retrial by the high rate protocol by the full duplex communication or the retrial by the protocol by the half duplex communication is automatically selected in accordance with the communication error so that the communication to the destination station is efficiently executed.

Further, when the success rate of the high rate protocol by the full duplex communication is very low, the high rate protocol by the full duplex communication is not set in the destination station so that a wasteful work is avoided and the entire communication time is reduced.

The present invention is not limited to the above embodiments but various modifications thereof may be made.

In accordance with the present embodiment, when the high rate protocol by the full duplex communication is not permitted due to the reduction of the quality of the line to the destination station, the protocol is switched to the half duplex communication to continue the communication so that proper communication is attained. Further, the switching from the high rate protocol by the full duplex communication to the protocol by the half duplex communication is simple.

Further, when the communication error occurs in the high rate protocol by the full duplex communication, the retrial by the high rate protocol by the full duplex communication or the retrial by the protocol by the half duplex communication is automatically set in accordance with the content of the communication error so that the communication to the destination station is effectively executed.

Further, when the success ratio of the high rate protocol by the full duplex communication to the destination station is low, the high rate protocol by the full duplex communication is not set so that a wasteful operation is avoided and the communication time is reduced.

What is claimed is:

1. A data communication apparatus capable of communicating data using a first procedure by full duplex communication or using a second procedure by half duplex communication, said apparatus comprising:

procedure selecting means for performing a third procedure and for selecting one of the first and second procedures to communicate data on the basis of a performance of the third procedure;

data communicating means for communicating data in accordance with the selected one of the first and second procedures; and changing means for monitoring, during a performance of data communication using the first procedure, whether or not data communication using the first procedure is able to be continued, and for changing said data communicating means to perform data communication using the second procedure without performing the third procedure when the data communication using the first procedure is not able to be continued, wherein in a case where a procedure signal for full duplex communication has not been received for a predetermined time period, said changing means determines that data communication using the first procedure is not able to be continued.

2. A data communication apparatus according to claim 1, wherein the third procedure is a procedure in accordance with the V.8 recommendation of ITU-T.

3. A data communication apparatus according to claim 2, wherein the first procedure is a procedure in accordance with the V.34 recommendation of ITU-T, and the second procedure is a procedure in accordance with the T.30 recommendation of ITU-T.

4. A data communication apparatus according to claim 1, further comprising:

registering means for, in response to said changing means determining that a first data communication using the first procedure to a destination is not able to be continued, registering information, indicating that the first data communication was not able to be continued, corresponding to the destination; and means for selecting the second procedure on the basis of the registered information without performing the third procedure when an additional data communication to the destination is designated.

5. A data communication apparatus according to claim 4, further comprising recalling means for recalling the destination when the first data communication to the destination has failed, wherein the additional data communication to the destination is designated in a recalling process of said recalling means.

6. A data communication apparatus capable of communicating data using a first procedure by full duplex communication or using a second procedure by half duplex communication, said apparatus comprising:

procedure selecting means for performing a third procedure and for selecting one of the first and second procedures to communicate data on the basis of a performance of the third procedure;

data communicating means for communicating data using the selected one of the first and second procedures;

monitoring means for monitoring, during performance of data communication using the first procedure, whether or not data communication using the first procedure is able to be continued;

registering means for, in response to said monitoring means determining that a first data communication using the first procedure to a destination is not able to be continued, registering information, indicating that the first data communication was not able to be continued, corresponding to the destination; and means for selecting the second procedure on the basis of the registered information without performing the third procedure when an additional data communication to the destination is designated.

7. A data communication apparatus according to claim 6, further comprising recalling means for recalling the destination when the first data communication to the destination has failed, wherein the additional data communication to the destination is designated in a recalling process of said recalling means.

8. A data communication apparatus according to claim 6, wherein in a case where a procedure signal for full duplex communication has not been received for a predetermined time period, said monitoring means determines that data communication using the first procedure is not able to be continued.

9. A data communication apparatus according to claim 6, wherein said registering means registers the information in response to a manual instruction.

10. A data communication apparatus according to claim 6, wherein the third procedure is a procedure in accordance with the V.8 recommendation of ITU-T.

11. A data communication apparatus according to claim 10, wherein the first procedure is a procedure in accordance with the V.34 recommendation of ITU-T, and the second procedure is a procedure in accordance with the T.30 recommendation of ITU-T.

12. A data communication apparatus according to claim 6, further comprising display means for displaying information on a success ratio of the first procedure.

13. A data communication method operative in a data communication apparatus capable of communicating data using a first procedure by full duplex communication or using a second procedure by half duplex communication, said method comprising the steps of:

performing a third procedure;

selecting one of the first and second procedures to communicate data on the basis of a performance of the third procedure;

communicating data using the selected one of the first and second procedures;

monitoring, during a performance of data communication using the first procedure, whether or not data communication using the first procedure is able to be continued; and changing said data communicating step to perform data communication using the second procedure without performing the third procedure when date communication using the first procedure is not able to be continued, wherein in a case when a procedure signal for full duplex communication has not been received for a predetermined time period, said monitoring step determines that data communication using the first procedure is not able to be continued.

14. A data communication method according to claim 13, wherein the third procedure is a procedure in accordance with the V.8 recommendation of ITU-T.

15. A data communication method according to claim 14, wherein the first procedure is a procedure in accordance with the V.34 recommendation of ITU-T, and the second procedure is a procedure in accordance with the T.30 recommendation of ITU-T.

16. A data communication method according to claim 13, further comprising the steps of:

in response to said monitoring step determining that a first data communication using the first procedure to a destination is not able to be continued, registering information, indicating that the first data communication was not able to be continued, corresponding to the destination; and selecting the second procedure on the basis of the registered information without performing the third procedure when an additional data communication to the destination is designated.

17. A data communication method according to claim 16, further comprising the step of recalling the destination when the first data communication to the destination has failed, wherein the additional data communication to the destination is designated in a recalling process of said recalling step.

18. A data communication method operative in a data communication apparatus capable of communicating data using a first procedure by full duplex communication or a using a second procedure by half duplex communication, said method comprising the steps of:

performing a third procedure;

selecting one of the first and second procedures on the basis of a performance of the third procedure;

communicating data with a destination using the selected one of the first and second procedures;

monitoring, during performance of data communication using the first procedure, whether or not data communication using the first procedure is able to be continued;

in response to said monitoring step determining that a first data communication using the first procedure to a destination is not able to be continued, registering information, indicating that the first data communication was not able to be continued, corresponding to the destination; and selecting the second procedure on the basis of the registered information without performing the third procedure when an additional data communication to the destination is designated.

19. A data communication method according to claim 18, further comprising the step of recalling the destination when the first data communication to the destination has failed, wherein the additional data communication to the destination is designated in a recalling process of said recalling step.

20. A data communication method according to claim 18, wherein in a case where a procedure signal for full duplex communication has not been received for a predetermined time period, said monitoring step determines that data communication using the first procedure is not able to be continued.

21. A data communication method according to claim 18, wherein said registering step registers the information in response to a manual instruction.

22. A data communication method according to claim 18, wherein the third procedure is a procedure in accordance with the V.8 recommendation of ITU-T.

23. A data communication method according to claim 22, wherein the first procedure is a procedure in accordance with the V.34 recommendation of ITU-T, and the second procedure is a procedure in accordance with the T.30 recommendation of ITU-T.

24. A data communication method according to claim 18, further comprising the step of displaying information on a success ratio of the first procedure.

* * * * *

UNITED STATES PATENT AND TRADEMARK OFFICE
CERTIFICATE OF CORRECTION

PATENT NO. : 5,721,731

DATED : February 24, 1998

INVENTOR(S) : TAKEHIRO YOSHIDA

It is certified that error appears in the above-identified patent and that said Letters Patent is hereby corrected as shown below:

<u>COLUMN 8</u>

Line 39, "memory" should read --memory 24.--.

<u>COLUMN 15</u>

Line 13, "date" should read --data--.
   Line 50, "a" (second occurrence) should be deleted.

Signed and Sealed this

Twenty-eighth Day of July, 1998

Attest:

BRUCE LEHMAN

*Attesting Officer*     *Commissioner of Patents and Trademarks*